(12) United States Patent
Mortimer

(10) Patent No.: US 11,787,578 B2
(45) Date of Patent: Oct. 17, 2023

(54) CLEANER ASSEMBLY FOR AN AUTOMATED DISPENSING DEVICE

(71) Applicant: Express Scripts Strategic Development, Inc., St. Louis, MO (US)

(72) Inventor: Craig F. Mortimer, Casa Grande, AZ (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

(21) Appl. No.: 17/483,532

(22) Filed: Sep. 23, 2021

(65) Prior Publication Data
US 2022/0097878 A1    Mar. 31, 2022

Related U.S. Application Data

(60) Provisional application No. 63/083,439, filed on Sep. 25, 2020.

(51) Int. Cl.
| | | |
|---|---|---|
| *B65B 5/10* | (2006.01) | |
| *A61J 7/00* | (2006.01) | |
| *B65G 45/22* | (2006.01) | |
| *A61J 1/03* | (2023.01) | |

(52) U.S. Cl.
CPC ............... *B65B 5/103* (2013.01); *A61J 1/03* (2013.01); *A61J 7/0076* (2013.01); *B65G 45/22* (2013.01); *B65G 2201/027* (2013.01); *B65G 2201/0267* (2013.01)

(58) Field of Classification Search
CPC .......... B65B 5/103; A61J 1/03; A61J 7/0076; B65G 45/22; B65G 2201/0267; B65G 2201/027

USPC ........................................................ 221/13
See application file for complete search history.

(56) References Cited

U.S. PATENT DOCUMENTS

| | | | | |
|---|---|---|---|---|
| 2,630,245 A | * | 3/1953 | Maier ................ | B65D 83/0409 221/265 |
| 3,081,588 A | * | 3/1963 | Klapes .................... | B65B 5/103 53/55 |
| 3,858,715 A | * | 1/1975 | Brock ..................... | B65G 45/18 198/496 |
| 3,999,239 A | * | 12/1976 | Misuna ................. | B41F 35/001 451/108 |
| 4,019,217 A | * | 4/1977 | Schinke .................... | B08B 1/00 118/203 |
| 4,782,980 A | * | 11/1988 | Heimlich ........... | B65D 83/0409 221/265 |

(Continued)

FOREIGN PATENT DOCUMENTS

| | | | | | |
|---|---|---|---|---|---|
| CN | 103198570 B | * | 3/2016 | ........... | A45D 44/005 |
| JP | 2004105514 A | * | 4/2004 | ............... | B08B 1/04 |

(Continued)

*Primary Examiner* — Rakesh Kumar
(74) *Attorney, Agent, or Firm* — Dickinson Wright PLLC

(57) ABSTRACT

The cleaner assembly is configured for cleaning an automated dispensing device is described herein. The cleaner assembly includes a pallet; a plurality of side walls enclosing an inner chamber; a blower configured to propel contaminants into said inner chamber; and at least one roller operably supported by and projecting above at least one of said side walls, said at least one roller being configured to scrape contaminants off of a base plate of the automated dispensing device and towards said blower.

20 Claims, 17 Drawing Sheets

(56) References Cited

U.S. PATENT DOCUMENTS

| | | | | |
|---|---|---|---|---|
| 5,117,968 A * | 6/1992 | Rivera | B66B 31/02 | 198/496 |
| 5,280,845 A * | 1/1994 | Leight | G07F 11/44 | 221/265 |
| 5,463,839 A * | 11/1995 | Stange | B65B 5/103 | 53/504 |
| 5,609,268 A * | 3/1997 | Shaw | A61J 7/0481 | 221/82 |
| 5,884,751 A * | 3/1999 | Metivier | B65G 45/18 | 198/496 |
| 5,893,450 A * | 4/1999 | Metivier | B65G 45/18 | 198/496 |
| 6,170,229 B1 * | 1/2001 | Kim | B65B 35/56 | 53/238 |
| 6,256,963 B1 * | 7/2001 | Kim | B65B 5/103 | 53/238 |
| 6,681,550 B1 * | 1/2004 | Aylward | B65B 5/103 | 53/244 |
| 6,732,884 B2 * | 5/2004 | Topliffe | A61J 7/0481 | 221/121 |
| 7,424,946 B2 * | 9/2008 | Filippi | F27D 99/00 | 15/256.51 |
| 7,513,132 B2 * | 4/2009 | Wright | D06F 43/08 | 68/18 F |
| 7,784,477 B2 | 8/2010 | Seasly | | |
| 8,261,939 B2 * | 9/2012 | Knoth | B65B 5/103 | 221/92 |
| 8,376,124 B1 * | 2/2013 | Rosen | B66B 31/003 | 198/496 |
| 8,573,385 B2 * | 11/2013 | Yun | B66B 31/003 | 198/321 |
| 8,985,388 B2 * | 3/2015 | Ratnakar | A61J 7/0481 | 221/218 |
| 8,992,830 B2 | 3/2015 | Park | | |
| 9,043,015 B2 * | 5/2015 | Ratnakar | A61J 7/0445 | 700/244 |
| 9,526,806 B2 | 12/2016 | Park | | |
| 9,669,951 B2 * | 6/2017 | Hellenbrand | B65B 5/103 | |
| 9,789,584 B2 | 10/2017 | Regan | | |
| 10,499,778 B2 | 12/2019 | Klintemyr | | |
| 10,557,996 B2 | 2/2020 | Lu | | |
| 10,662,121 B1 * | 5/2020 | D'Avela | C04B 40/0231 | |
| 10,729,297 B2 | 8/2020 | Klintemyr | | |
| 10,730,305 B2 * | 8/2020 | Mu | B41J 2/16552 | |
| 10,890,594 B2 * | 1/2021 | Niiyama | G01N 35/04 | |
| 11,089,925 B2 * | 8/2021 | Ed | A47L 9/2852 | |
| 11,199,853 B1 * | 12/2021 | Afrouzi | G05D 1/0246 | |
| 11,396,447 B1 * | 7/2022 | Mortimer | B65B 29/02 | |
| 2002/0108356 A1 * | 8/2002 | Aylward | B65B 57/14 | 53/473 |
| 2004/0128955 A1 * | 7/2004 | Aylward | B65B 5/103 | 53/247 |
| 2006/0025884 A1 * | 2/2006 | Henkel | B65B 37/04 | 221/9 |
| 2006/0071011 A1 * | 4/2006 | Varvarelis | A61J 7/0481 | 221/9 |
| 2007/0186961 A1 * | 8/2007 | Seasly | B08B 7/0021 | 134/103.3 |
| 2009/0044495 A1 * | 2/2009 | Aylward | B65B 35/46 | 53/244 |
| 2009/0281657 A1 * | 11/2009 | Gak | G07F 17/0092 | 700/242 |
| 2010/0178433 A1 * | 7/2010 | Wang | B05D 1/40 | 427/573 |
| 2010/0318218 A1 * | 12/2010 | Muncy, Jr. | G16H 20/13 | 221/199 |
| 2011/0042404 A1 * | 2/2011 | Koike | G07F 11/44 | 221/258 |
| 2011/0208352 A1 * | 8/2011 | Knoth | B65B 5/103 | 700/243 |
| 2012/0324829 A1 * | 12/2012 | Omura | G07F 11/44 | 53/147 |
| 2013/0084157 A1 * | 4/2013 | Staunton | B65G 47/91 | 414/752.1 |
| 2014/0244033 A1 * | 8/2014 | Ucer | A61J 7/0084 | 700/237 |
| 2014/0277702 A1 * | 9/2014 | Shaw | G07F 17/0092 | 700/232 |
| 2014/0305959 A1 * | 10/2014 | Chan | B08B 1/00 | 221/199 |
| 2014/0326744 A1 * | 11/2014 | Ratnakar | A61J 7/0445 | 221/9 |
| 2015/0206373 A1 * | 7/2015 | Kim | G07F 11/58 | 221/150 R |
| 2016/0304229 A1 * | 10/2016 | Hellenbrand | B65B 9/08 | |
| 2018/0168935 A1 * | 6/2018 | Chen | B65B 5/103 | |
| 2019/0105907 A1 * | 4/2019 | Mu | B41J 2/16538 | |
| 2020/0368113 A1 * | 11/2020 | Chen | A61J 7/0436 | |
| 2022/0097878 A1 * | 3/2022 | Mortimer | G07F 11/44 | |

FOREIGN PATENT DOCUMENTS

| | | | | |
|---|---|---|---|---|
| KR | 20160056706 A * | 5/2016 | | B65G 45/18 |
| WO | WO-9604171 A1 * | 2/1996 | | B65B 57/20 |
| WO | WO-2006129620 A1 * | 12/2006 | | B65B 5/103 |
| WO | WO-2009021171 A1 * | 2/2009 | | B65B 1/16 |

* cited by examiner

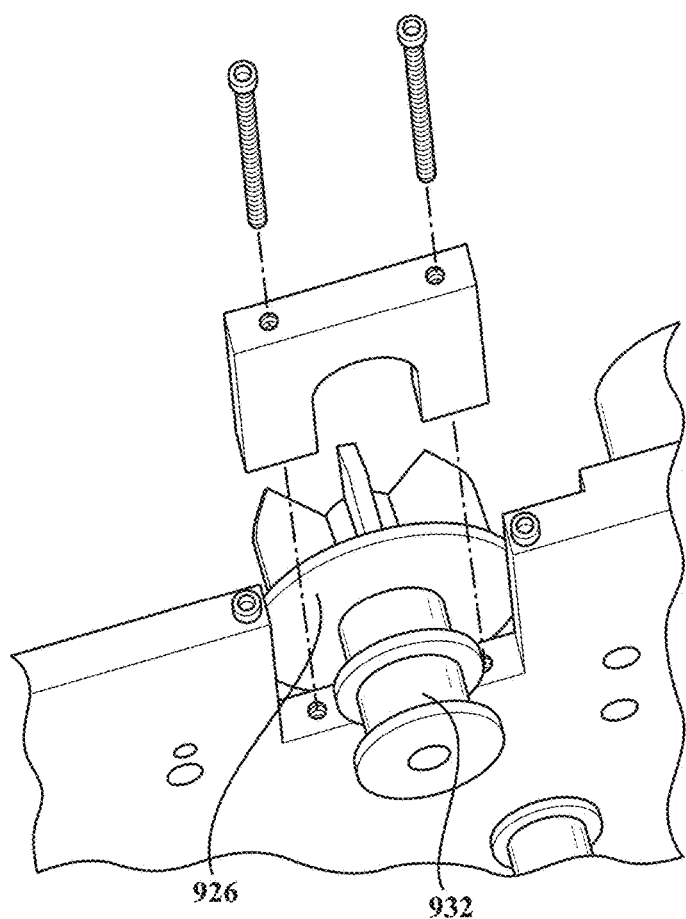
FIG. 13
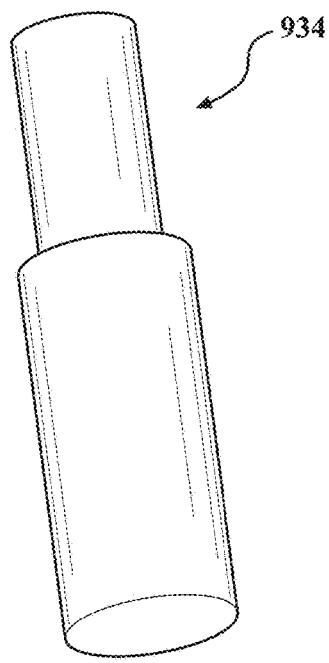
FIG. 14
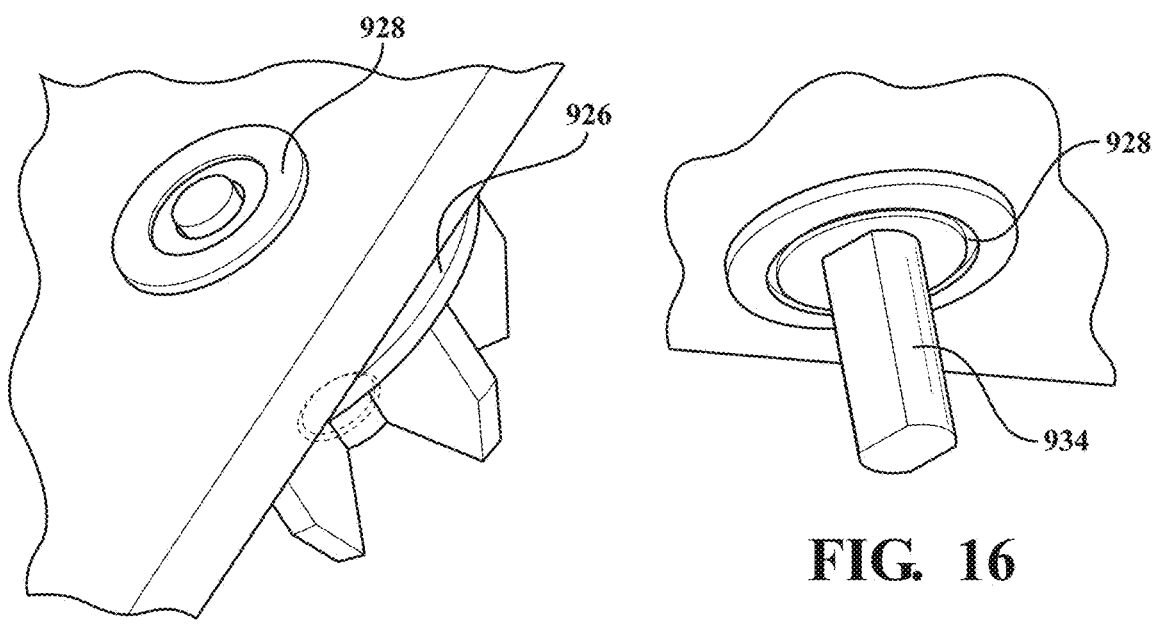
FIG. 15
FIG. 16

CLEANER ASSEMBLY FOR AN AUTOMATED DISPENSING DEVICE

CROSS-REFERENCE TO RELATED APPLICATION

This application claims priority to U.S. Provisional Patent App. No. 63/083,439, filed on Sep. 25, 2020, and entitled "CLEANER ASSEMBLY FOR AN AUTOMATED DISPENSING DEVICE," the entire disclosure of which is hereby incorporated herein by reference.

BACKGROUND

1. Field

The present disclosure is related generally to a cleaner assembly for cleaning an automated dispensing device that is configured to dispense medications into a plurality of containers on a pallet.

2. Related Art

Many high volume pharmacies include one or more automatic dispensing systems which are configured to automatically dispense medications into respective containers, such as bottles. In one type of such a dispensing system, a conveyor system brings a pallet holding a plurality of containers into a specific location so that the medications can fall under the influence of gravity directly into one of the containers. Operation of this system may produce dust, such as from the medications, which can accumulate on the dispensing system, thereby necessitating periodic cleaning. However, any down time of the dispensing system for cleaning purposes can be very inefficient. Therefore, there is a continuing need for a solution which can clean the dispensing system with minimal down time and in a safe manner which does not expose any persons to danger from the mechanical parts of the dispensing system and the pallet conveyor.

SUMMARY

In an example embodiment, a cleaner assembly for cleaning an automated dispensing device is provided. The cleaner assembly includes a pallet and a plurality of side walls enclosing an inner chamber. A blower is provided and is configured to propel contaminants into the inner chamber. At least one roller is operably supported by and projects above at least one of said side walls. The at least one roller is configured to scrape contaminants off of a base plate of the automated dispensing device and towards the blower.

In an example embodiment, the at least one roller includes a pair of rollers, and the blower is located between the rollers. The rollers are configured to be driven in opposite rotational directions to direct the contaminants towards the blower. The rollers may have different materials on the exterior thereof, e.g., different naps and different electrostatic attraction properties relative to each other.

In an example embodiment, the cleaner assembly includes a switch that is configured to be automatically activated when the pallet in a cleaning position adjacent the automated dispensing device and is configured to be automatically deactivated when the cleaner assembly is brought away from the automated dispensing device.

In an example embodiment, the automated dispensing device for dispensing medications into medication containers is provided. The automated dispensing device includes a plurality of pallets, and at least one of the pallets includes a plurality of medication containers. At least one of the pallets includes a cleaner assembly. A conveyor assembly is configured to bring the pallets to predetermined positions adjacent the automated dispensing device so that pharmaceuticals can be dispensed from the at least one automated dispensing device into the medication containers. The conveyor assembly is also configured to move at least one pallet containing a cleaner assembly through a predetermined cleaning path whereby the cleaner assembly cleans a base plate of the at least one automated dispensing device. A controller is configured to sense whether a pallet carries medication containers or a cleaner assembly.

In an example embodiment, the at least one automated dispensing device contains a plurality of pharmaceuticals and a plurality of chutes, and the conveyor assembly is configured to move any of said medication containers on one of said pallets into alignment with any of said plurality of chutes.

In an example embodiment, the at least one automated dispensing device includes a plurality of automated dispensing devices.

In an example embodiment, the conveyor and the pallet system are configured to bring the cleaner assembly to any of said plurality of automated dispensing devices.

In an example embodiment, the conveyor assembly includes at least one main track and a plurality of sub-tracks that extend from the main tracks to locations vertically below the automated dispensing devices so that the pharmaceuticals can fall under the influence of gravity from the automated dispensing devices into the medication containers on the pallet.

In an example embodiment, the automated dispensing device further includes a home base that is operably connected with at least one main track and that is configured to hold the cleaner assembly between cleanings so that a user can safely empty the cleaner assembly of contaminants while the at least one automated dispensing devices are in operation.

In an example embodiment, the at least one main track includes a pair of main tracks with one of the main track extending through an open loop for receiving pallets into the automated dispensing system and for delivering pallets out of the automated dispensing system, and the other of the main tracks extends through a closed loop.

In an example embodiment, the cleaner assembly includes a pallet and a plurality of side walls that enclose an inner chamber. A blower is configured to propel contaminants into the inner chamber. At least one roller is operably supported by and projects above at least one of the side walls. The at least one roller is configured to scrape contaminants off of a base plate of the at least one automated dispensing device and towards the blower.

In an example embodiment, the at least one roller includes a pair of rollers, and the blower is located between the rollers. The rollers are configured to be driven in opposite rotational directions to direct the contaminants towards the blower.

In an example embodiment, the cleaner assembly further includes at least one switch that is configured to be automatically activated when the cleaner assembly is in a cleaning position adjacent the at least one automated dispensing device and that is configured to be automatically deactivated when the cleaner assembly is brought away from the at least one automated dispensing device.

Another aspect of the present disclosure is related to a method of cleaning an automated pharmaceutical dispensing device. The method includes the step of preparing a cleaner assembly that includes at least one roller and a blower. With a conveyor assembly, the cleaner the at least one roller is brought into contact with a portion of an automated dispensing device. With the at least one roller, the method proceeds with scraping contaminants off of the portion of the automated dispensing device in a direction towards the blower. The method continues with the step of propelling the scraped off contaminants into a chamber of the cleaner assembly with the blower.

In an example embodiment, the at least one roller is a pair of rollers that are spaced apart from one another, and the blower is located in a space between the rollers.

In an example embodiment, the method further includes the step of bringing the cleaner assembly to a home base with the conveyor assembly that is spaced from the automated dispensing device so that the cleaner assembly can be safely emptied of contaminants while the automated dispensing device continues operation.

In an example embodiment, the method further includes the step of bringing a pallet that includes at least one medication container to the automated dispensing device.

In an example embodiment, the method further includes the step of dispensing at least one pharmaceutical from the automated dispensing device into the at least one medication container.

In an example embodiment, the automated dispensing device is a first automated dispensing device of a plurality of dispensing devices, and the method further includes the step of, with the conveyor assembly, bring the cleaner assembly from the first automated dispensing device to another automated dispensing device.

In an example embodiment, the method further includes the step of cleaning the another automated dispensing device.

BRIEF DESCRIPTION OF THE DRAWINGS

These and other features and advantages of the present disclosure will become more readily appreciated when considered in connection with the following description of the presently preferred embodiments, appended claims and accompanying drawings, in which:

FIG. 13 is an enlarged view of a portion of the cleaner assembly;

FIG. 14 is a rod for attaching a roller holder with a pulley in the cleaner assembly of FIG. 9;

FIG. 15 is an enlarged view of a portion of the cleaner assembly and illustrating the connection between a roller holder with a side wall;

FIG. 16 is an enlarged view of a portion of the cleaner assembly and shown a flat piece on the rod of FIG. 14 for attachment with a pulley;

DESCRIPTION OF THE ENABLING EMBODIMENT

As discussed in further detail below, the present disclosure is related to an automatic dispensing system that includes a filling cabinet, which contains a plurality of pharmaceuticals or other individualized items that may create dust when dispensed, which are arranged above a pallet conveyor. The pallet conveyor is configured to automatically bring a container on a pallet into a location directly below the filling cabinet. Once the container is in place, the filling cabinet releases one or more pharmaceuticals, which fall under the influence of gravity into the container. A cleaner assembly is provided that can be moved by the same pallet conveyor into the location below the filling cabinet and can be activated to clean dust and other debris from a base plate of the filling cabinet. The cleaner assembly is able to automatically clean without stopping the automatic dispensing system and without exposing a person to danger from the many moving parts of the automatic dispensing system as it operates. The cleaner assembly may be loaded with cleaner data relating to where the assembly should start and end cleaning, what components should be used to clean, and where the cleaning should occur along the conveyor system.

Figure 1:
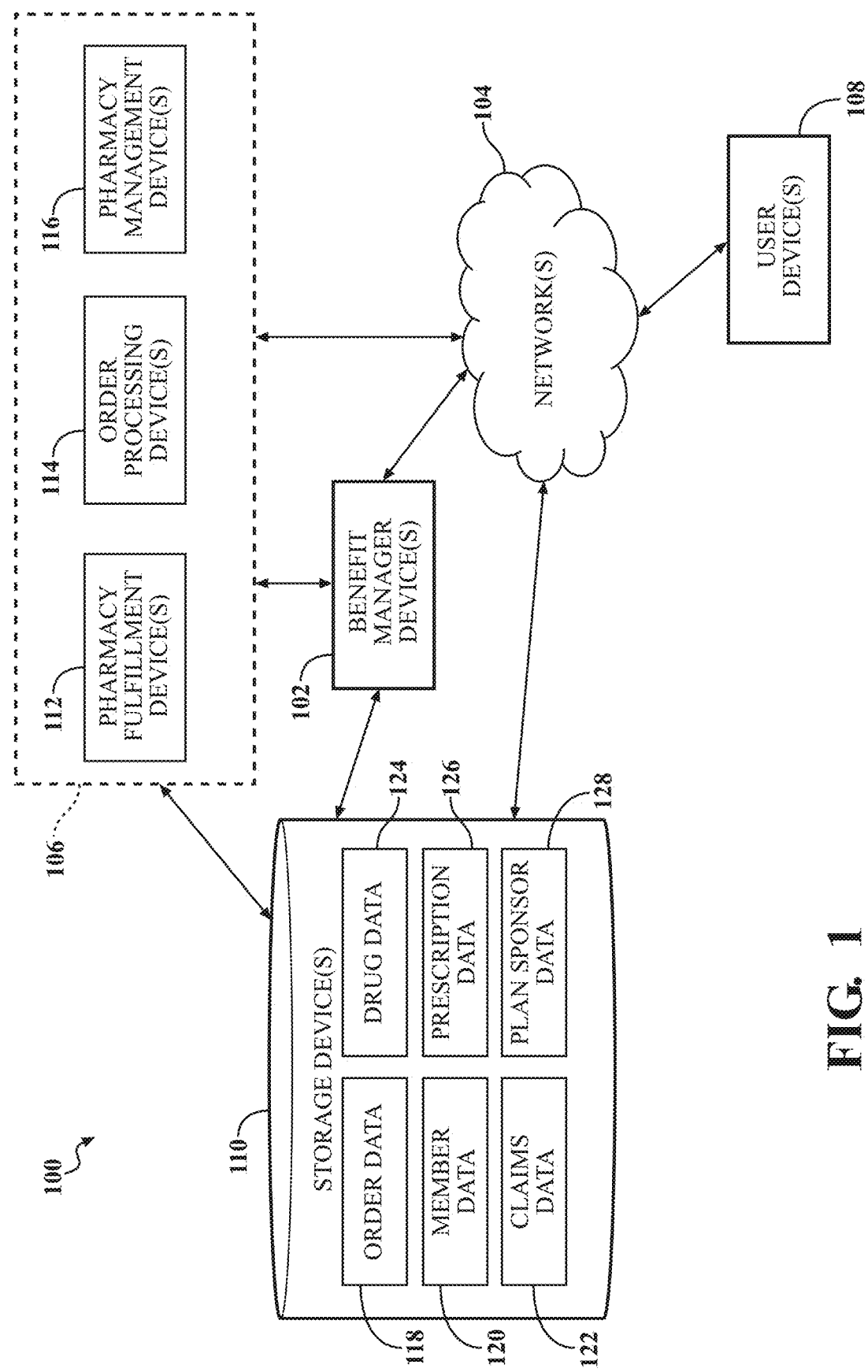
FIG. 1 is a block diagram of an example system according to an example embodiment.

FIG. 1 is a block diagram of an example implementation of a system 100, according to an example embodiment. While the system 100 is generally described as being deployed in a high-volume pharmacy or fulfillment center (e.g., a mail order pharmacy, a direct delivery pharmacy, an automated pharmacy, multiple package delivering center, and the like), the system 100 and/or components thereof may otherwise be deployed (e.g., in a lower volume pharmacy). A high-volume pharmacy may be a pharmacy that is capable of filling prescriptions automatically, mechanically, manually, or a combination thereof. The system 100 may include a benefit manager device 102, a pharmacy device 106, and a user device 108, which may communicate with each other directly and/or over a network 104. The system may also include a storage device 110.

The benefit manager 102 is a device operated by an entity that is at least partially responsible for creation and/or management of the pharmacy or drug benefit. While such an entity operating the benefit manager device 102 is typically a pharmacy benefit manager (PBM), other entities may operate the benefit manager device 102 either on behalf of themselves, the PBM, another entity, or other entities. For example, the benefit manager device 102 may be operated by a health plan, a retail pharmacy chain, a drug wholesaler, a data analytics or other type of software-related company, or the like. In some embodiments, a PBM that provides the pharmacy benefit may also provide one or more than one additional benefits including a medical or health benefit, a dental benefit, a vision benefit, a wellness benefit, a radiology benefit, a pet care benefit, an insurance benefit, a long term care benefit, a nursing home benefit, and the like. The PBM may, in addition to its PBM operations, operate one or more than one pharmacy. The pharmaceutical vending machines or kiosks, and the like.

Some of the operations of the PBM that operates the benefit manager device 102 may include the following activities and processes. A member (or a person on behalf of the member) of a pharmacy benefit plan administered by or through the PBM attempts to obtain a prescription drug at a retail pharmacy location (e.g., a location of a physical store) from a pharmacist or a pharmacist technician. The member may also attempt to obtain the prescription drug through mail order drug delivery from a mail order pharmacy location, which may be the high-volume pharmacy system 100. In some embodiments, the member may also attempt to obtain the prescription drug directly or indirectly through the use of a machine, such as a kiosk, vending unit, mobile electronic device, or a different type of mechanical electrical, electronic communication device, and/or computing device. Such a machine may be filled with the prescription drug in prescription packaging, which may include multiple prescription components, by the high-volume pharmacy system 100.

The member may have a copayment for the prescription drug that reflects an amount of money that the member is responsible to pay the pharmacy for the prescription drug. The money paid by the member to the pharmacy may come from personal funds of the member, a health savings account (HAS) of the member or the member's family, a health reimbursement arrangement (HRA) of the member or the member's family, a flexible spending account (FSA) of the member or the member's family, or the like. In some instances, an employer of the member may directly or indirectly fund or reimburse the member for the copayments.

The amount of the co-pay required form the member may vary with different pharmacy benefit plans having different plan sponsors or clients and/or prescription drugs. The member's copayment may be based on a flat copayment (e.g., $10), co-insurance (e.g., 10%), and/or a deductible (e.g., for first $500 of annual prescription drug expenses) for certain prescription drugs, certain types and/or classes of prescription drugs, and/or all prescription drugs. The copayment may be stored in the storage 110 or determined by the benefit manager device 102.

In some instances, the member may not pay the copayment or may only pay a portion of the copayment for the prescription drug. For example, if the usual and customary cost for a generic version of a prescription drug is $4, and the member's flat copayment is $20 for the prescription drug, the member may only be required to pay $4 to receive the prescription drug. In another example involving a worker's compensation claim. No copayment may be due by the member for the prescription drug.

In addition, copayments may also vary based on different delivery channels used for the prescription drug to be received by the member. For example, the copayment for receiving the prescription drug from a mail order pharmacy location may be less than the copayment for receiving the prescription drug from a retail pharmacy location.

In conjunction with receiving the copayment (if any) from the member and dispensing the prescription drug to the member, the pharmacy submits a claim to the PBM for the prescription drug. After receiving the PBM (e.g., through the benefit manager device 102) may perform certain adjudication operations including verifying eligibility of the member, identifying and/or reviewing an applicable formulary for the member to determine any appropriate copayment, coinsurance, and deductible for the prescription drug, and performing a drug utilization review (DUR) on the member. The PBM provides a response to the pharmacy (e.g., from the benefit manager device 102 to the pharmacy device 106) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated.

The aforementioned adjudication operations generally occur before the copayment is received and the prescription drug is dispensed. However, in some instances these operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be determined at least partially based on the type(s) of pharmacy network in which the pharmacy is included. Other factors may also be used to determine the amount in addition to the type of pharmacy network. For example, if the member pays the pharmacy for the prescription drug without the prescription drug benefit provided by the PBM (e.g., by paying cash without use of the prescription drug benefit or by use of a so-called pharmacy discount card offering other negotiated rates), the amount of money paid by the member may be different than when the member uses prescription or drug benefit. In some embodiments, the amount of money received by the pharmacy for dispensing the prescription drug and for the prescription drug itself may be higher than when the member uses the prescription or drug benefit. Some or all of the foregoing operations may be performed by executing instructions stored on the benefit manager device 102 and/or an additional device.

Examples of the network 104 include Mobile Communications (GSM) network, a code division multiple access (CDMA) network, $3^{rd}$ Generation Partnership Project (3GPP), an Internet Protocol (IP) network, a Wireless Application Protocol (WAP) network, a Wi-Fi network, or an IEEE 802.11 standards network, as well as various combinations thereof. The network 104 may include an optical network. The network 104 may be a local area network or a global communication network, such as the Internet. In some embodiments, the network 104 may include a network dedicated to prescription orders, e.g., a prescribing network such as the electronic prescribing network operated by Surescripts of Arlington, Va.

Moreover, although the system shows a single network 104, multiple networks can be used. The multiple networks may communicate in series with each other to link the devices 102, 106-110 or in parallel to link the devices 102, 106-110.

The pharmacy device 106 may include an order processing device 114, a pharmacy manager device 116, and a pharmacy fulfillment device 112 in communication with each other directly and/or over the network 104.

The order processing device 114 may receive information regarding filling prescriptions and may direct an order component to one or more than one of the devices of the pharmacy fulfillment device 112 at a pharmacy. The pharmacy fulfillment device 112 may fulfill, dispense, aggregate, and/or pack the order components of the prescription drugs in accordance with one or more than one of the prescription orders directed by the order processing device 114. The order processing device 114 may be deployed in the system 100, or may otherwise be used.

In general, the order processing device 114 is a device located within or otherwise associated with the pharmacy to enable fulfillment of a prescription and dispensing prescription drugs by the pharmacy fulfilment device 112. In some embodiments, the order processing device 114 may be an external device separate from the pharmacy and communicate with other devices located within the pharmacy.

For example, the external order processing device 114 may communicate with an internal order processing device 114 and/or other devices located within the system 100. In some embodiments, the external order processing device 114 may have limited functionality (e.g., as operated by a patient requesting fulfillment of a prescription drug), while the internal pharmacy order processing device 114 may have greater functionality (e.g., as operated by a pharmacist).

The order processing device 114 may track the prescription order as it is fulfilled by the pharmacy fulfillment device 112. The prescription order may include one or more than one prescription drugs to be filled by the pharmacy. The order processing device 114 may make pharmacy routing decisions and/or order consolidation decisions for the particular prescription order. The pharmacy routing decisions may include what device(s) in the pharmacy are responsible for filling or otherwise handling certain portions of the prescription order. The order consolidation decisions include whether portions of one prescription order or multiple prescription orders should be shipped together for a patient or a patient family. The order processing device 114 may also track and/or schedule literature or paperwork associated with each prescription order or multiple prescription orders that are being shipped together.

The pharmacy management device 116 may enable and/or facilitate management and operations in a pharmacy. For example, the pharmacy management device 116 may provide functionality to enable receipt and processing of prescription drug claims, management of pharmacy personnel, management of pharmaceutical and non-pharmaceutical products, track products in the pharmacy, record workplace incidents involve personnel and products, and the like. In some embodiments, the order processing device 114 may operate in combination with the pharmacy management device 116.

In some embodiments, the pharmacy management device 116 may be a device associated with a retail pharmacy location (e.g., exclusive pharmacy location, a grocery store with a retail pharmacy, or a general sales store with a retail pharmacy) or other type of pharmacy location at which a member attempts to obtain a prescription. The pharmacy management device 116 may be utilized by the pharmacy to submit the claim to the PBM (e.g., through the benefit management device 102) for adjudication.

In some embodiments, the pharmacy management device 116 may enable information exchange between the pharmacy and the PBM, for example, to allow the sharing of member information such as drug history, and the like, that may allow the pharmacy to better service a member (e.g., by providing more informed therapy consultation and drug interaction information, etc.). In some embodiments, the benefit manager 102 may track prescription drug fulfillment and/or other information for patients that are not members or have not identified themselves as members, at the time (or in conjunction with the time) in which they seek to have a prescription filled at a pharmacy.

The pharmacy fulfillment devices 112, the order processing device, and/or the pharmacy management device 116 may include circuitry, a processor, a memory to store data and instructions, and an electronic communication device to provide a communication functionality. These devices 112-116, in some embodiments are dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116 may include circuitry, a processor, a memory to store data and instructions, and communication functionality. These devices 112-116, in some embodiments, are dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (e.g., by utilizing a local storage) and/or through the network 104 (e.g., by utilizing a cloud configuration or software as a service, etc.) with the storage 110.

The user device 108 is used by a device operator. The device operator may be a user (e.g., an employee, a contractor, a benefit member, a patient of the pharmacy, or the like) associated with the system 100. Other device operators may also operate the user device 108. In some embodiments, the user device 108 may enable the device operator to attend to pharmacy operations in a convenient manner (e.g., remote from a pharmacy). In some embodiments, the user device 108 may enable the device operator to receive information about pharmacy processes, prescription drug fulfillment status, and the like. In an example, the cleaner assembly may be a type of user device 108. In some embodiments, the pharmacy management device 116 may access certain cleaning data and download cleaning instructions to the cleaning assembly. The cleaning instructions can tell the cleaning device how it should operate, when it should operate and where it should operate as described herein.

The user device 108 may be a stand-alone device that solely provides at least some of the functionality of the methods and systems, or may be a multi-use device that has functionality outside off analysis of the methods and systems. Examples of the user device 108 may include a mobile electronic device, such as an iPhone or iPad by Apple, Inc., and mobile electronic devices powered by Android by Google, Inc. The user device 108 may also include other computing devices, such as desktop computing devices, notebook computing devices, netbook computing devices, gaming devices, and the like. Other types of electronic devices may also be used.

The storage device 110 may include: a non-transitory storage (e.g., memory, hard disk, CD-ROM, and the like) in communication with the benefit manager device 102, the pharmacy device 106, and/or the user device 108 directly and/or over the network 104. The non-transitory storage may store order data 118, member 120, claims data 122, drug data 124, prescription data 126, and/or plan sponsor 128. Further, the system 100 may include additional devices, which may communicate with each other directly or over the network 104.

The order data 118 may be related to a prescription order. The order data may include the type of the prescription drug (e.g., drug name and strength) and quantity of the prescription drug. The order data 118 may also include data used for completion of the prescription, such as prescription materials and/or the type and/or size of container in which the drug is dispensed or in which is requested to be dispensed. In general, prescription materials include an electronic copy of information regarding the prescription drug for inclusion with or otherwise provided (e.g., via email) in conjunction with the fulfilled prescription. The prescription materials may include electronic information regarding drug interaction warnings, recommended usage possible side effects, expiration date, date of prescribing, or the like. The order data 118 may be used by the pharmacy to fulfill a pharmacy order.

In some embodiments, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (e.g., a prescription bottle and sealing lid, prescription packaging, and the like) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information, such as bar code data read from pallets, bins, trays, carts, and the like used to facilitate transportation of prescriptions within the pharmacy may also be stored as order data 118.

The member data 120 includes information regarding the members associated with the PBM. The information stored as member data 120 may include personal information, personal health information, protected health information, fitness data, health data, web and mobile app activity, and the like. Examples of the member data 120 include name, address, telephone number, e-mail address, prescription drug history, and the like. The member data 120 may include a plan sponsor identifier that identifies the plan sponsor associated with the member and/or a member identifier that identifies the member to the plan sponsor. The member data 120 may also include, by way of example, dispensation preferences such as type of label, type of cap, message preferences, language preferences, or the like.

The member data 120 may be accessed by various devices in the pharmacy to obtain information utilized for fulfillment and shipping of prescription orders. In some embodiments, an external order processing device 114 operated by or on behalf of a member may have access to at least a portion of the member data 120 for review, verification, or other purposes.

In some embodiments, the member data 120 may include information for persons who are patients of the pharmacy but are not members in a pharmacy benefit plan being provided by the PBM. For example, these patients may obtain drugs directly from the pharmacy, through a private label service offered by the pharmacy, or otherwise. In general, the use of the terms member (e.g., of a prescription drug benefit plan) and patient (e.g., of a pharmacy) may be used interchangeably in this disclosure.

The claims data 122 includes information regarding pharmacy claims adjusted by the PBM under a drug benefit program provided by the PBM for one, or more than one, plan sponsor. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility, and the like. Additional information may be included.

In some embodiments, other types of claims beyond prescription drug claims may be stored in the claims data 122. For example, medical claims, dental claims, wellness claims, or other types of health care-related claims for members may be stored as a portion of the claims data.

In some embodiments, the claims data 122 includes claims that identify the members with whom the claims are associated. In some embodiments, the claims data 122 includes claims that have been de-identified (e.g., associated with a unique identifier but not with a particular, identifiable member), aggregated, and/or otherwise processed.

The drug data 124 may include drug name (e.g., technical name and/or common name), other names by which the drug is known by, active ingredients, an image of the drug (e.g., in pill form), and the like. The drug data 124 may include information associated with a single medication or multiple medications.

The prescription data 126 may include information regarding prescriptions that may be issued by prescribers on behalf of patients, who may be members of the pharmacy benefit plan, for example to be filled by a pharmacy. Examples of the prescription data 126 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.).

In some embodiments, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, and the like.

The cleaner data 130 may include data instructing the cleaning device when it should clean, what cleaning components it should operate and how it should clean any particular device within the order fulfillment system. For example, a high volume fill device may have a unique number of dispensing devices or a unique number of dispensing towers. The cleaner data 130 may store this information to be downloaded to the cleaner assembly. The cleaner data 130 can also include the setting for the vacuum, i.e., the suction power of the vacuum. The cleaner data 130 can also include instructions for the revolution per minute of the brushes and which brushes should be used at what location in the dispensing system.

Figure 2:
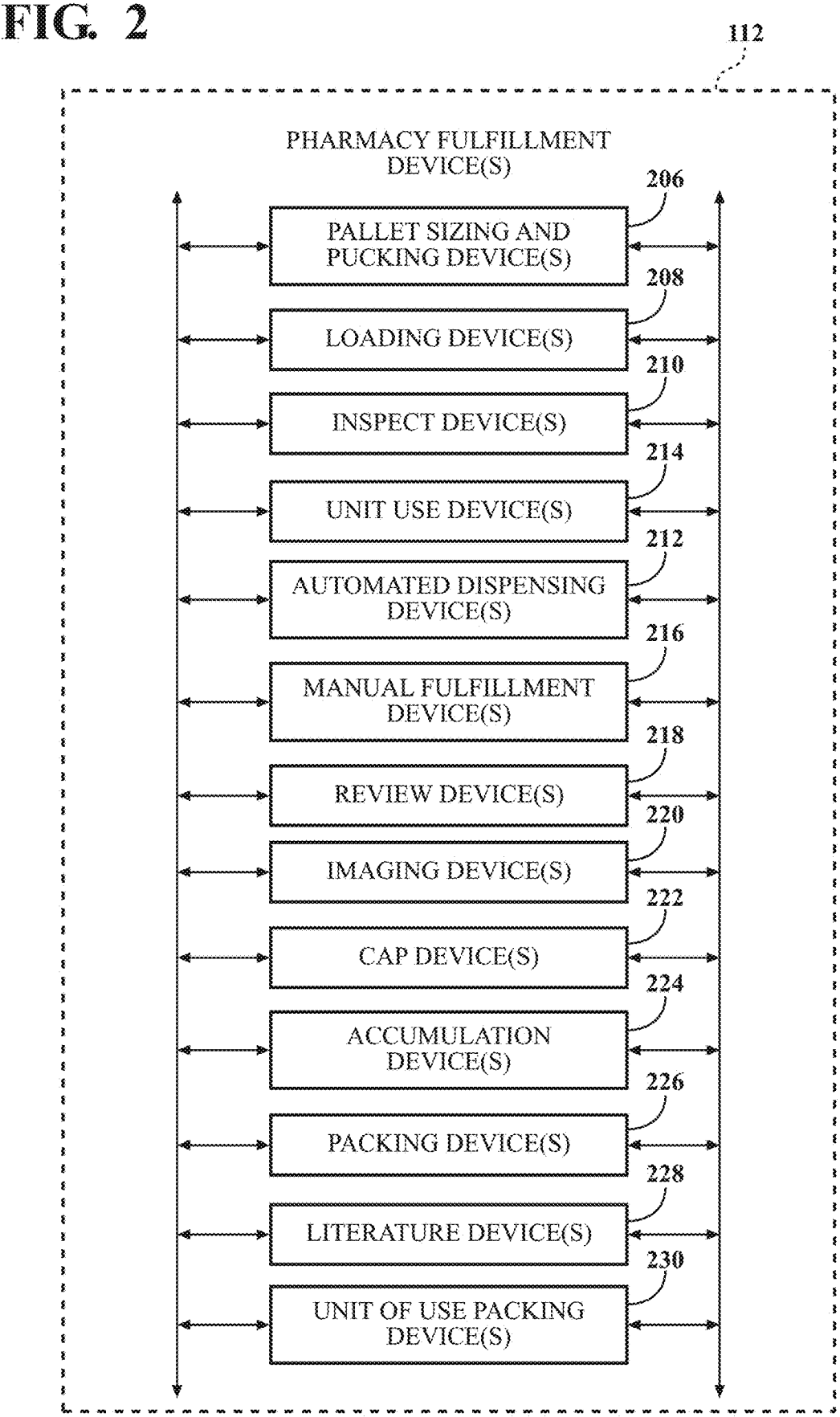
FIG. 2 is a block diagram of an example order processing device that may be deployed within the system of FIG. 1.

FIG. 2 illustrates the pharmacy fulfillment device 112, according to an example embodiment. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device, the order processing device 114, and/or the non-transitory storage 110, directly or over the network 104. Specifically, the pharmacy fulfillment device 112 may include pallet sizing and pucking device(s); loading device(s) 208; inspect device(s) 210, unit of use device(s) 214, automated dispensing device(s) 212, manual fulfillment device(s) 216, review device(s) 218, imaging device(s) 220, cap device(s) 222, accumulation device(s) 224, literature device(s) 228, packing device(s) 226, and unit of use packing device(s) 230. The pharmacy fulfillment device 112 can include a cleaner device 232, as described herein, e.g., cleaner device 920. Further, the pharmacy fulfillment device 112 may include additional devices, which may communicate with each other directly or over the network 104.

In some embodiments, operations performed by one or more of these devices 206-230 may be performed sequentially, or in parallel with the operations of devices as may be coordinated by the order processing device 114. In some embodiments, the order processing device 114 tracks a prescription with the pharmacy based on operations performed by one or more than one of the devices 206-230.

In some embodiments, the pharmacy fulfillment device 112 may transport prescription drug containers, for example, between more than one of the devices 206-230 in a high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism, or the like. In one embodiment, the loading device 208 has robotic arms or pickers to grasp a prescription container and move it to and from a pallet or to and from a puck. The loading device may also print a label that is appropriate for a container that is to be loaded onto the pallet and apply the label to the container. The pallet may be located on a conveyor assembly during these operations (e.g., at the high volume fulfillment center or the like).

The inspect device 210 may verify that containers in a pallet are correctly labeled and in the correct spot on the pallet. The inspect device 210 may scan the label on one or more than one container on the pallet. Labels of containers may be scanned or imaged in full or in part by the inspect device 210. Such imaging may occur after the container has been lifted out of its puck by a robotic arm, picker, or the like, or may be otherwise scanned or imaged while retained in the puck. In some embodiments, images and/or video captured by the inspect device may be stored in the storage device as a portion of the order data 118.

The unit of use device 212 may temporarily store, monitor, label, and/or dispense unit of use products. In general, unit of use products are prescription drug products that may be delivered to a patient or member without being repackaged at the pharmacy. These products may include pills in a container, pills in a blister pack, inhalers, liquids in a spray or other dispensing container, and the like. Prescription drug products dispensed by the unit of use device 212 may be packaged individually or collectively for shipping, or may be shipped in combination with other prescription drugs dispensed by other devices (e.g., in the high volume fulfillment center).

At least some of the operations of the devices 206-230 may be directed by the other processing device 114. For example, the manual fulfillment device 216, the review device 218, the automated dispensing device 212, the packing device 226, and/or another device may receive instructions provided by the order processing device.

The automated dispensing device 212 may include one or more than one device that dispenses prescription drugs or pharmaceuticals into prescription containers in accordance with one or multiple prescription orders. In general, the automated dispensing device 212 may include mechanical and electronic components with, in some embodiments, software and/or logic to facilitate pharmaceutical dispensing that would otherwise be performed in a manual fashion by a pharmacist and/or pharmacist technician. For example, the automated dispensing device 212 may include high volume fillers (HVFs) that fill a number of prescription drug types at a rapid rate and blister pack machines that dispense and pack drugs into a blister pack. Prescription drugs dispensed by the automated dispensing devices 212 may be packaged individually or collectively for shipping, or may be shipped in combination with other prescription drugs dispensed by other devices in the high volume fulfillment center.

The manual fulfillment device 216 may provide for manual fulfillment of prescriptions. For example, the manual fulfillment device 216 may receive or obtain a container and enable fulfillment of the container by a pharmacist or pharmacy technician. In some embodiments, the manual fulfillment device 216 provides the filled container to another device in the pharmacy fulfillment devices 112 to be joined with other containers in a prescription order for a patient or member. In general, a manual fulfillment may include operations at least partially performed by a pharmacist or a pharmacy technician. For example, a person may retrieve a supply of the prescribed drug, may make an observation, may count out a prescribed quantity of drugs and place them into a prescription container, or the like.

Some portions of the manual fulfillment process may be automated by use of a machine. For example, counting of capsules, tablets, or pills may be at least partially automated (e.g., through use of a pill counter or the like). Prescription drugs dispensed by the manual fulfillment device 216 may be packaged individually or collectively for shipping or may be shipped in combination with other prescription drugs dispensed by other devices in the high volume fulfillment center.

The review device 218 may process prescription containers to be reviewed by a pharmacist for proper pill count, exception handling, prescription verification, and the like. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been cancelled, containers with defects, and the like. In an example embodiment, the manual review may be performed at the manual station.

The imaging device 220 may image containers prior to filling and/or after they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114, and/or stored in the storage device 110 as part of the order data 118.

The cap device 222 may be used to cap or otherwise seal a prescription container. In some embodiments, the cap device 222 may secure a prescription container with a type of cap in accordance with a patient preference (e.g., a preference regarding child resistance, a preference regarding built-in adherence functionality, or the like), a plan sponsor preference, a prescriber preference, or the like. The cap device 222 may also etch a message into the cap or otherwise associate a message into the cap, although this process may be performed by a different device in the high-volume fulfillment center.

The accumulation device 224 accumulates various containers of prescription devices in a prescription order. The accumulation device 224 may accumulate prescription containers from various devices or areas of the pharmacy. For example, the accumulation device 224 may accumulate prescription containers from the unit of use device 212, the automated dispensing device, the manual fulfillment device 216, and the review device 218, at the high-volume fulfillment center. The accumulation device 224 may be used to group the prescription containers prior to shipment to the member or otherwise.

The literature device 228 prints, or otherwise generates, literature to include with prescription drug orders. The literature may be printed on multiple sheets of substrates, such as paper, coated paper, printable polymers, or combinations thereof. The literature printed by the literature device 228 may include information required to accompany prescription drugs included in a prescription order, relating to prescription drugs in the order, financial information associated with the order (e.g., an invoice or an account statement, or the like).

In some embodiments, the literature device 228 folds or otherwise prepares the literature for inclusion with a prescription drug order (e.g., in a shipping container or the like). In some embodiments, the literature device 228 that prints the literature may be separate from the literature device that prepares the literature for inclusion with a prescription order. The packing device 226 packages a prescription order in preparation for shipping the order. The packing device 226 may box, bag, or otherwise package the fulfilled prescription order for delivery. The packing device 226 may be a wrap seal device. A wrap seal device deployed as the packing device 226 may be a wrap seal device. A wrap seal device deployed as the packing device 226 may pause before an index; during the pause, one or more bottle, envelope or literature items have been placed within a vacuum pocket of the wrap seal device. After any bottle, envelope, or literature items have been placed in the pocket, the wrap seal device may index; specifically, the vacuum pocket may move forward. In an example embodiment, the forward movement is about the length of a bag (for example, between about 16 and 20 inches).

The packing device 226 may further place inserts (e.g., literature or other papers) into the packaging received from the literature device 228 or otherwise. For example, bulk prescription orders may be shipped in a box, while other prescription orders may be shipped in a bag which may be a wrap seal bag. The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, sort by zip code, or the like). The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, sort by zip code, or the like). The packing device 226 may include ice or temperature sensitive elements for prescriptions which are to be kept within a temperature range during shipping in order to retain efficacy or otherwise. The ultimate package may then be shipped through postal mail, through a mail order delivery service that ships via ground and/or air (e.g., UPS®, FedEx®, or DHL®, or the like), through delivery service, through a local delivery service (e.g., a courier service), through a locker box at a shipping site (e.g., an Amazon® locker, library locker, a post office box, or the like) or otherwise.

The unit of use packing device 230 packages a unit of use prescription order in preparation for shipping the order.

The pharmacy fulfillment device 112 in FIG. 2 may include single devices 206-230 or multiple devices 206-230 (e.g., depending upon implementation in a pharmacy). The devices 206-230 may be the same type or model of device or may be different device types or models. When multiple devices are present, the multiple devices may be of the same device type or models or may be a different device type or model. The types of devices 206-230 shown in FIG. 2 are example devices. In other configurations of the system 100, lesser, additional, or different types of devices may be included.

Moreover, multiple devices may share processing and/or memory resources. The devices 206-230 may be located in the same area or in different locations. For example, the devices 206-230 may be located in a building or a set of adjoining buildings. The devices 206-230 may be interconnected (e.g., by conveyors), networked, and/or otherwise in contact with one another or integrated with one another (e.g., at the high-volume fulfillment center). In addition, the functionality of a device may be split among a number of discrete devices and/or combined with other devices.

Figure 3:
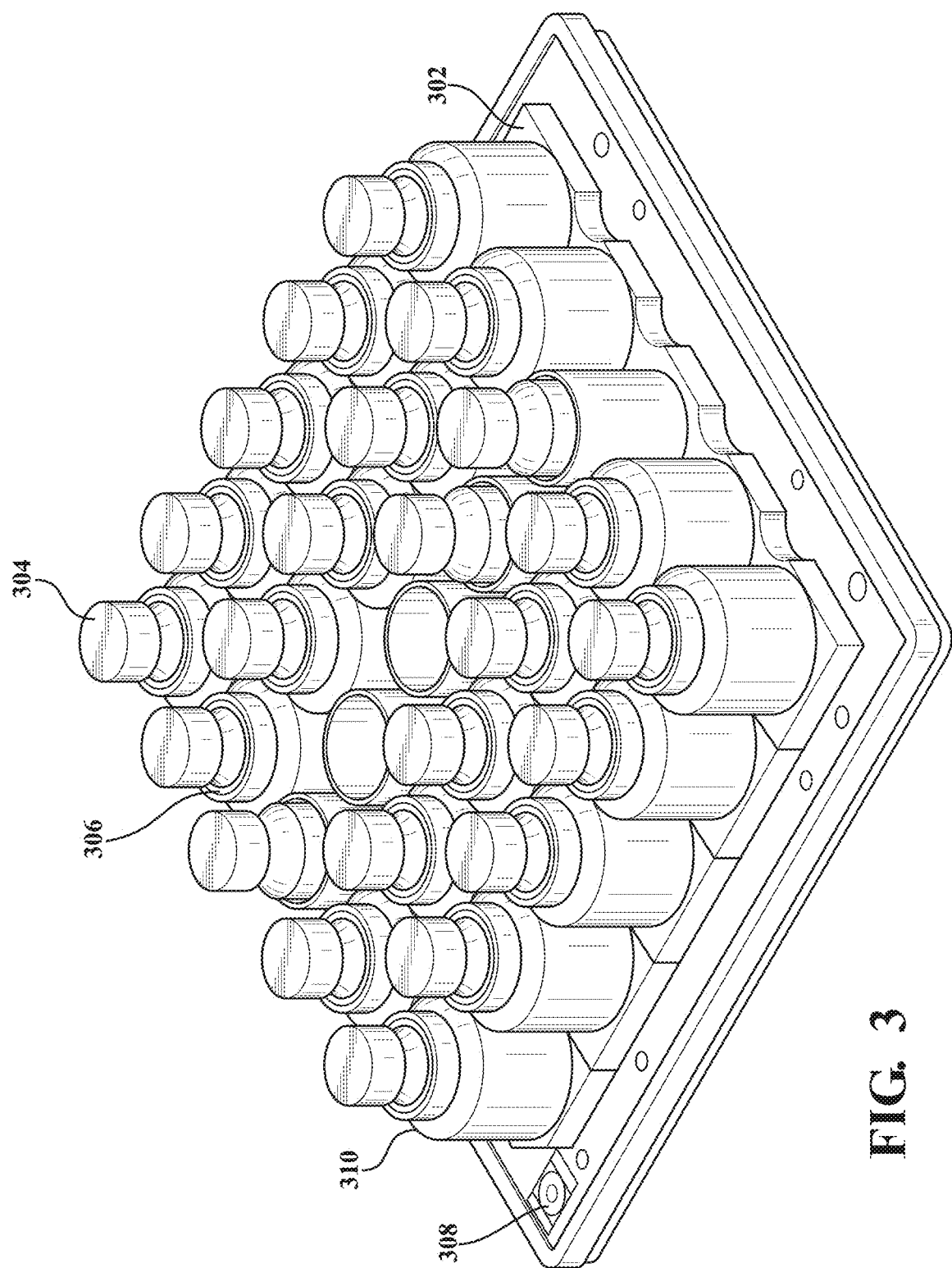
FIG. 3 is a top, perspective view of a pallet that may be deployed within the system of FIG. 1 according to an example embodiment.

FIG. 3 illustrates a pallet 302, according to an example embodiment, which may be used in the pharmacy fulfillment device 112 of the system 100 of FIG. 1. The pallet 302 may be a transport structure for a number of prescription containers 304, and may include a number of cavities 306. While the pallet 302 is shown to include twenty-five (25) cavities in a five-by-five cavity row/column configuration, other numbers of categories and/or cavity configurations of varying shapes, sizes, and/or dimensions may be used. In some embodiments, the pallet 302 may be substantially square and, in such an embodiment, have a width and length of between approximately 18 inches and 22 inches (e.g., approximately 18 inches, 19 inches, 20 inches, 21 inches, or 22 inches). In some embodiments, the width and/or length may be greater than approximately 22 inches or less than approximately 18 inches.

In an example embodiment, the cavities 306 are spaced on the pallet 302 such that the distance between center points of adjacent cavities 306 is approximately 3 and 4 inches (e.g., approximately 3 inches, 3.25 inches, 3.5 inches, 3.75 inches, or 4 inches). In another example embodiment, the distance between center points of adjacent cavities 306 is more than approximately 4 inches. In yet another example embodiment, the distance between center points of adjacent cavities 306 is less than approximately 3 inches apart. In some embodiments, the distance between center points of adjacent cavities 306 is variable, i.e., some adjacent cavities 306 may be spaced further apart from one another than other adjacent cavities 306.

The pallet 302 may be made in whole or in part of metal, such as aluminum. Other suitable materials may be used for the pallet 302, such as plastic. The pallet 302 may be rigid so that the cavities remain 306 in known locations that can be tracked while the pallet 302 moves through the pharmacy fulfillment device 112. The pallet 302 may include bumpers.

In some embodiments, other carriers beyond the pallet 302 and/or no carrier may be used to move containers 304 individually or groups of containers 304 through the pharmacy fulfillment device 112.

The pallet 302 may retain one or more than one container 304. A container 304 may be generally cylindrical and may be one or a variety of sizes utilized by a pharmacy for fulfillment of a prescription. For example, a pharmacy may have two different sized containers or three different sized containers 304, all of which may be retained in the pallet 304. Any number of differently sized containers 304 may be used with the pallet 302. While the container 304 is generally denoted as being used with the pallet 302, the containers 304 may otherwise be used in the system 100 or in a different system. Shapes beyond cylindrical shapes may be used for the containers 304. Examples of other shapes include regular prisms, elliptical cylinders, and combinations thereof. Pucks 310 may be utilized to receive and support the outer shapes of some of the containers 304, e.g., larger containers 304 may be received within cavities 306 of the pallet 302 and smaller containers 304 may be received within cavities 306 of pucks 310 that are received within the cavities 306 of the pallet 302. The containers 304 may be disposed in the pallet 302 such that they are close to one another but do not touch.

The pallet 302 may include a radio-frequency identification (RFID) tag 308. The RFID tag 308 may be an active RFID tag, such as an active RFID tag with a close reading range. In some embodiments, the RFID tag 308 is an active, narrowband, read/write RFID tag.

The RFID tag 308 of a particular pallet 302 may store data (or otherwise facilitate the access of data, e.g., from the database 108) associated with the containers 304 that have been, are, and/or will be placed within the pallet 302, such as the order data, the claims data, the drug data, the prescription data, and/or the plan sponsor data associated with such containers. Other data may be stored by and/or associated with the RFID tag 314, such as the age of the pallet 302, the number of times the pallet 302 has been used to transport containers 304 through the system 100, the number of errors associated with the pallet 302, and the like. The RFID tag 314 may also store the position of individual containers 304 on the pallet 302. In an example embodiment, the RFID tag 308 of the pallet 302, while deployed within an automated dispensing device 212, stores data associated with one or more of the following data fields: (1) container identifiers, (2) identifier of the particular automated dispensing device 212, (3) identifiers of the particular cells from which a particular container will be filled (as described below), (4) container properties (e.g., the status of containers 304 on the pallet, such as whether the containers 304 have passed an inspection station and have been identified as containers 304 to be filled in the particular automated dispensing device 212), and (5) the pallet route within the automated dispensing device 212. The RFID tag, or other type of machine readable tag, may identify the pallet or the location of the pallet, which can trigger operation of the cleaning component(s) on a cleaning assembly that can be integrated into a pallet.

The pucks 310 may be used to modify the size of the cavities 306 to allow the pallet 302 to accommodate different sizes of the containers 304.

Figure 4:
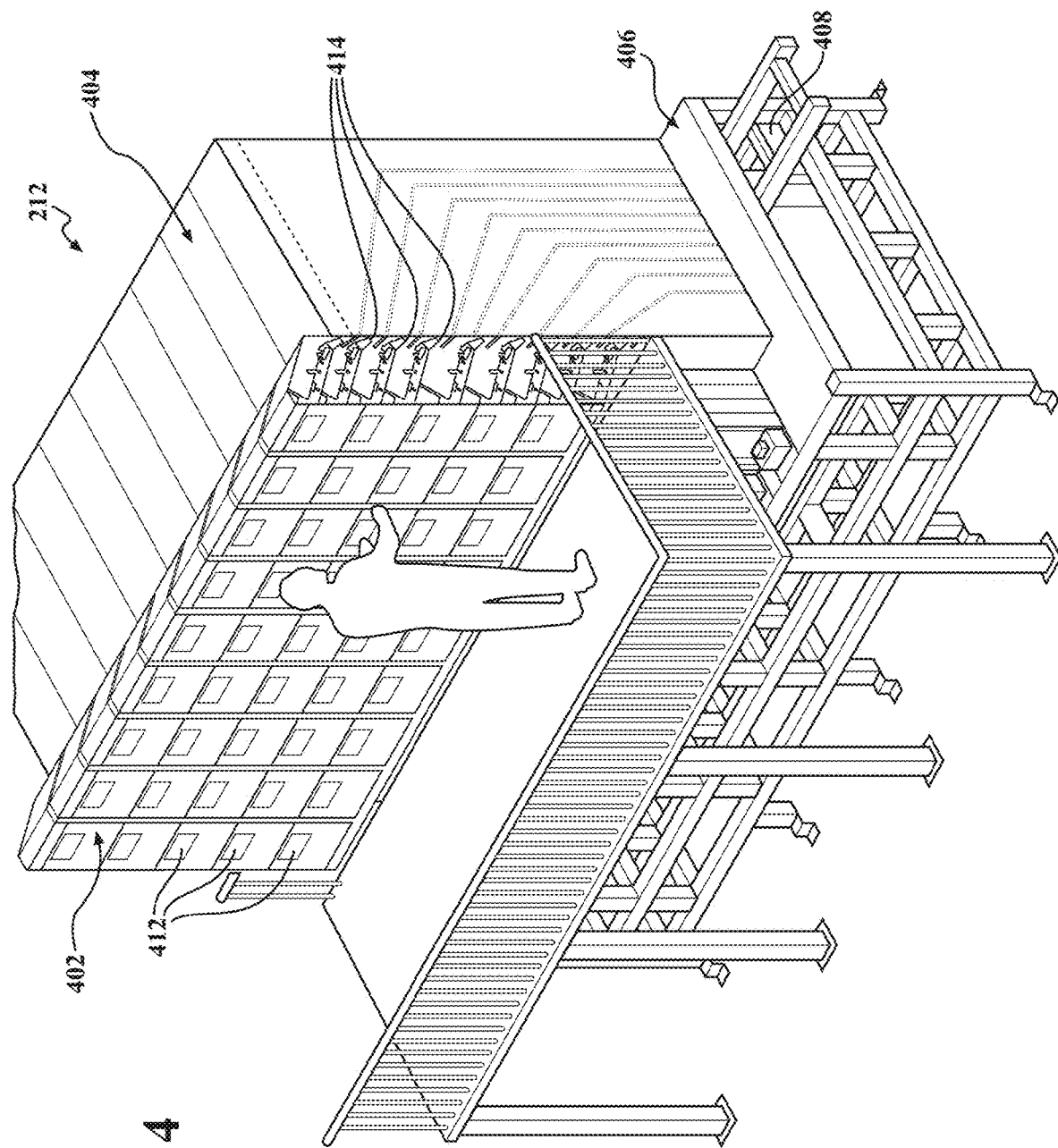
FIG. 4 is a perspective view of an automated dispensing device that may be deployed within the system of FIG. 1 according to an example embodiment.
Figure 5:
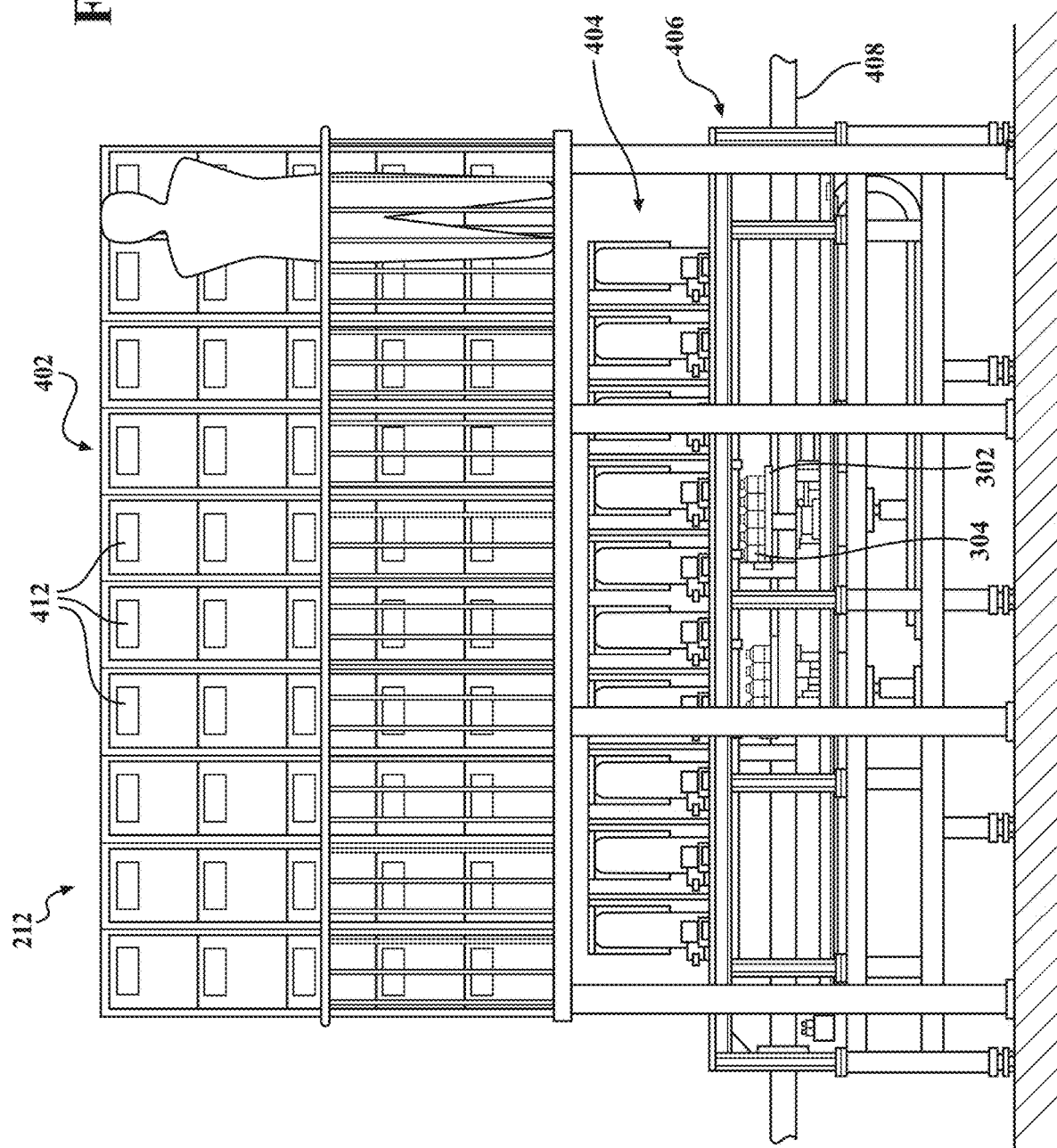
FIG. 5 is a side elevation view of the automated dispensing device of FIG. 4.
Figure 6:
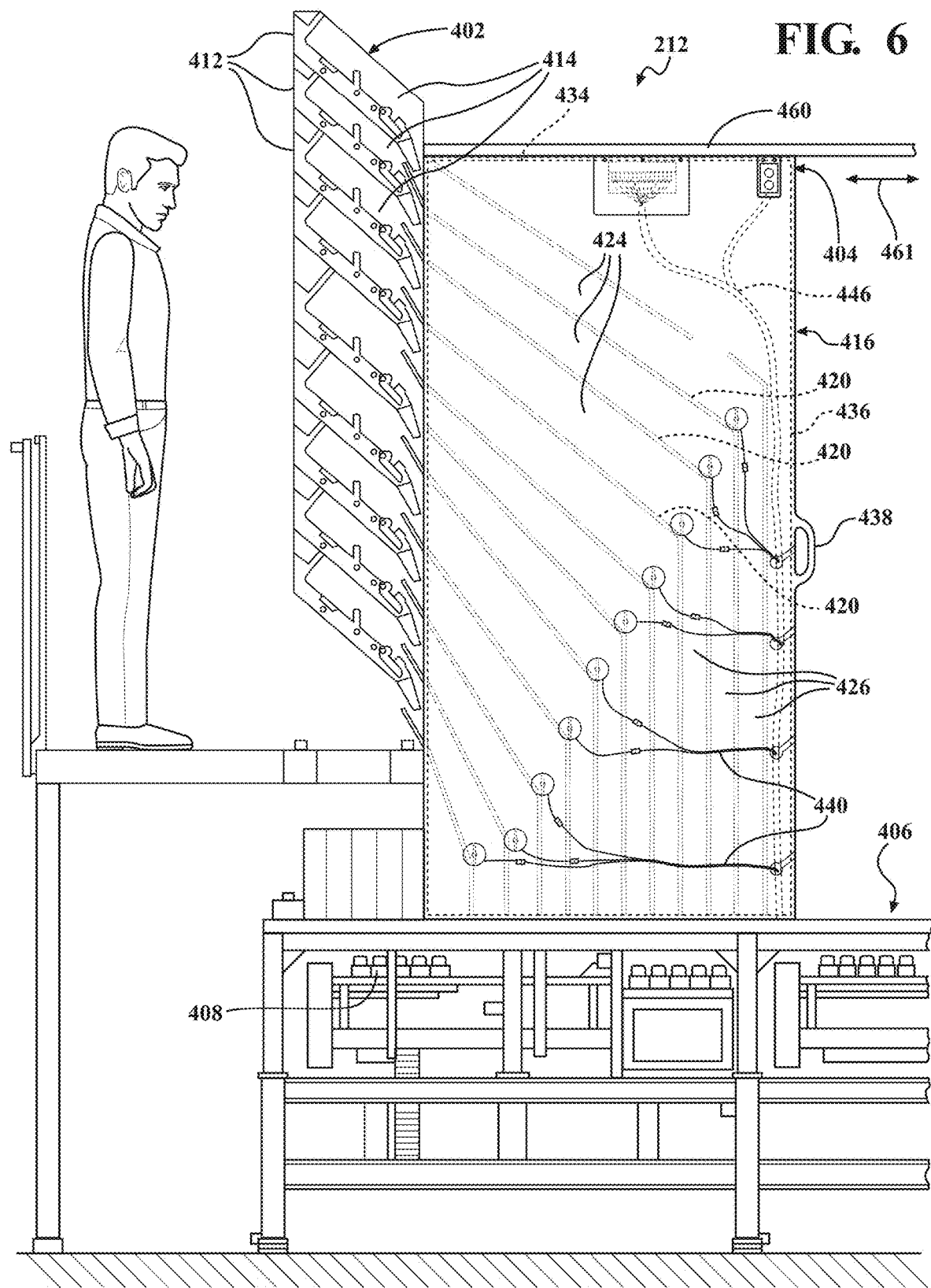
FIG. 6 is a front elevation view of the automated dispensing device of FIG. 4.

FIGS. 4-6 illustrate the automated dispensing device 212, according to an example embodiment. The automated dispensing device 212 enables dispensing of a number of different types of pharmaceuticals in an automated or semi-automatic manner. The automated dispensing device 212 includes a filling cabinet 402, a prefill assembly 404, and a pallet system 406, which includes a pallet conveyor 408 (also known as a conveyor assembly). The filling cabinet 402 stores pharmaceuticals to be dispensed into containers 304 via the prefill assembly 404 and dispenses measured quantities of pharmaceuticals into the prefill assembly 404. The prefill assembly 404 stores the measured quantities of pharmaceuticals 410 and dispenses the measured quantities of pharmaceuticals 410 received from the filling cabinet 402 into containers 304 on the pallet 302 while the pallet 302 is positioned in the pallet system 406. The pallet conveyor 408 can move the pallets 302 into precise locations so that the pharmaceuticals fall directly from the prefill assembly 404 into the containers 304 and can transport the pallets 302 through some or all of the devices within the pharmacy fulfillment device 112 (shown in FIG. 2).

In the exemplary embodiment, the filling cabinet 402 is physically adjacent to the prefill assembly 404, and the prefill assembly 404 is physically located directly above the pallet system 406. For example, the filling cabinet 402 and prefill assembly 404 may be located on a second floor (e.g., in a building), and the pallet system 406 may be located on a second floor below the first. These components of the automated dispensing device 212 may be otherwise positioned to utilize gravity to move pharmaceuticals 410 from the filling cabinet 402 to the prefill assembly 404 and then to the containers 304 on the pallet 302 in the pallet system 406. For example, some portion of the filling cabinet 402 may extend below the first floor.

In the exemplary embodiment, the filling cabinet 402 includes multiple cells 412 arranged in a grid-like pattern with a plurality of columns and a plurality of rows. Specifically, in the exemplary embodiment, the filling cabinet 402 has ten (10) columns and nine (9) rows for a total of ninety cells 412. In some embodiments, the filling cabinet 402 has either more or fewer rows and/or columns of cells 412. The various cells 412 may each be adapted to similar or different pharmaceuticals 410, e.g., pills or capsules. For example, in some embodiments, a commonly prescribed pharmaceutical 410 may occupy more than one cell 412. The cells 412 are be adapted to receive inserts 414 which can hold the pharmaceuticals 410 then automatically dispense the pharmaceuticals 410 into the prefill assembly 404. In the exemplary embodiment, the inserts 414 can be pulled out of the cells 412 like drawers. In other embodiments, the inserts 414 may be permanently located in the cells 412. In some embodiments, two opposing filing cabinets 402 and two opposing prefill assemblies 404 may be positioned over the same pallet system 404.

In the exemplary embodiment, each insert 414 has a face plate with a door which must be unlocked to open. The door may be adapted to unlock pursuant to a process that mitigates risk of unauthorized access to the pharmaceuticals 410 within the insert 414 and/or to mitigate risks that unintended pharmaceuticals 410 will be added to the insert 414. For example, in the exemplary embodiment, the door of each cell 412 will unlock when identifying information associated with a pharmaceutical container is detected (e.g., by a pharmacist using a hand-held scanning device to read a bar code or other computer-readable element on the pharmaceutical container) that matches identifying information associated with the cell 412 (e.g., by a pharmacist using a hand-held scanning device to read a bar code or other computer-readable element on the face plate of the insert 414) and information about the pharmacist who fills the cell 412 (e.g., by a pharmacist using a hand-held scanning device to read a bar code or other computer-readable element on the pharmacist's badge). The inserts 414 may be otherwise accessed to receive pharmaceuticals 410 to be held and dispensed.

As shown in FIG. 6, each cell 412 has a pill counter with an output which feeds the pharmaceuticals contained therein into the prefill assembly 404. The prefill assembly 404 includes a plurality of doors 416 (one being shown), each of which includes a guiding system for guiding the pharmaceuticals dispensed from the respective cells 412 into the appropriate containers 304 on the pallet 302 in the pallet system 406. The doors 416 can be slid horizontally away from the filling cabinet 402 for maintenance either while the automated dispensing device 212 is in operation or shut down. The filling cabinet 402 is configured such that the cell 412 will not dispense pharmaceuticals 410 when the door 416 aligned that cell 412 is out of position, such as during maintenance.

Each door 416 includes a first panel and a second panel which are both generally rectangular in shape and which are both made out of a transparent material, such as plexiglass. A plurality of guiding members 420 are disposed between the first panel 418 and the second panel to define a plurality of chutes 424, 426 which guide the pharmaceuticals 410 dispensed by the cells 412 into the appropriate containers 304 being held in the pallet system 406. The pallet system 406 is configured such that any of the containers 304 located on the pallet 302 can be aligned with any of the chutes 424, 426. Thus, the pharmaceutical 410 contained in any of the cells 412 in the filling cabinet 402 can be dispensed into any of the containers on the pallet 302. In the exemplary embodiment, guiding members 420 are only fixedly attached with the second panel so that the first panel 418 can be removed from the door 416, such as during maintenance, without the guiding members 420 falling out of their respective positions. The guiding members 420 may be fixedly attached to the second panel through any suitable attachment means, such as fasteners. In one example embodiment, the pallet system 406 includes a gantry which can move the pallet 302 in three dimensions, i.e., two horizontal dimensions and a vertical dimension.

Each chute 424, 426 has a first portion 424 which extends at a downward angle away from the associated cell 412 and a second portion 426 which extends vertically downwardly from the first portion 424 towards the pallet system 406. The lengths of both the first and second portions 424, 426 of the chutes 424, 426 sequentially increase from the chute 424, 426 associated with the lowermost cell 412 in any column to the chute 424, 426 associated with the uppermost cell 412.

In the exemplary embodiment, for each chute 424, 426, a guidance device in the form of a gate 428 is positioned where the first portion 424 meets the second portion 426. In some embodiments, the gate 428 may be positioned at other locations along the first portion 424. The gate 428 can be selectively closed to restrict the passage of pharmaceuticals 410 and opened to allow the pharmaceuticals 410 to drop through the second portion 426 and into the container 304. The gate 428 allows the pharmaceuticals 410 to be staged or prepped prior to the container 304 reaching the correct location directly beneath the second portion 426 of the chute 424, 426. In other words, during operation, while a selected container 304 to receive a particular medication from one of the cells 412 is travelling on the pallet conveyor 408 to the location below the associated chute 424, 426, the cell 412 can count and release a measured quantity of a desired pharmaceutical 410 to the chute 424, 426. The measured quantity of pharmaceuticals 410 can then sit against the gate 428 while it is in the closed position until the container 304 is in the correct location. Only then does the gate 428 automatically open to allow the staged pharmaceuticals 410 to fall through the second portion 426 of the chute 424, 426 and into the container 304. This allows for reduced time between when the container 304 arrives in the correct location below the chute 424, 426 and when the measured quantity of pharmaceuticals 410 is dispensed into the container 304.

In some embodiments, one or more of the chutes 424, 426 may include a plurality of gates 428 for staging more than one measured quantity of pharmaceuticals 410. For example, a first measured quantity of pharmaceuticals 410 may be captured in the chute 424, 426 by one gate 428, and a second measured quantity of pharmaceuticals 410 may be captured in the chute 424, 426 by another gate 428. Additional gates 428 may also be included to capture additional measured quantities of pharmaceuticals 410 dispensed by the cells 412 prior to the containers 304 reaching the pallet system 406.

The gates 428 are opened and closed by respective electronic servo motors 430 which can automatically rotate the gate 428 between the open and closed positions. The gates 428 are attached with the first panel 418, which has a plurality of openings 432 for allowing the servo motors 430 to operably attach with the respective gates 428 in the chutes 424, 426. The prefill assembly 404 may also include other electronic components (such as, for example, sensors) in addition to the servo motors 430.

Each door 416 further includes a top wall 434 and a side wall 436 which both extend between and along respective edges of the first panel 418 and the second panel. A handle 438 is affixed with an outer surface of the side wall 436 for allowing a user to manually pull the door 416 away from the filling cabinet 402 during maintenance. In other embodiments, the door 416 is configured to move towards and away from the filling cabinet 402 through automatic means (such as electric, pneumatic, or hydraulic actuators) or through other manual means.

Figure 8:
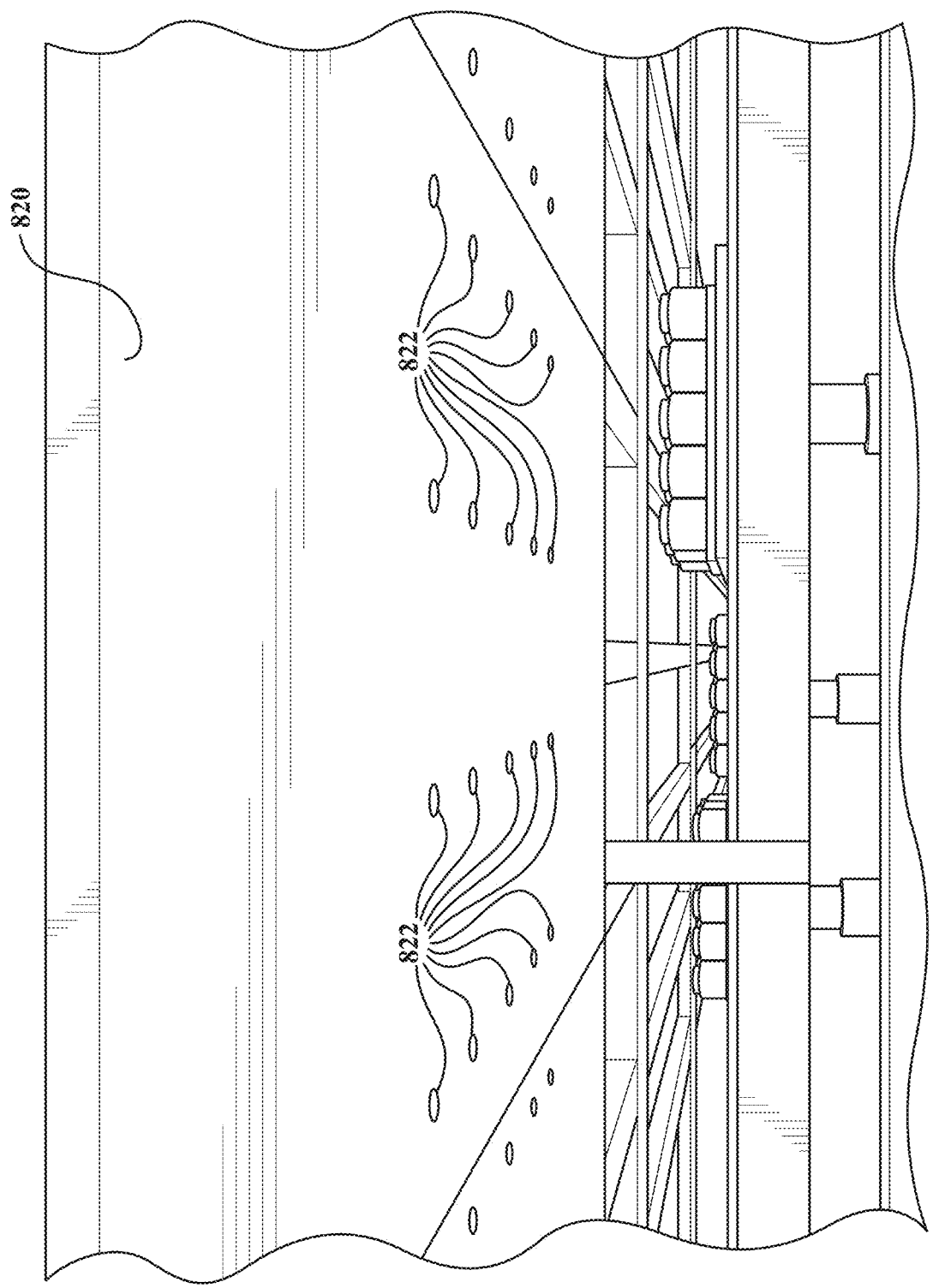
FIG. 8 is a perspective view showing a base plate of the automated dispensing device of FIG. 4.
Figure 9:
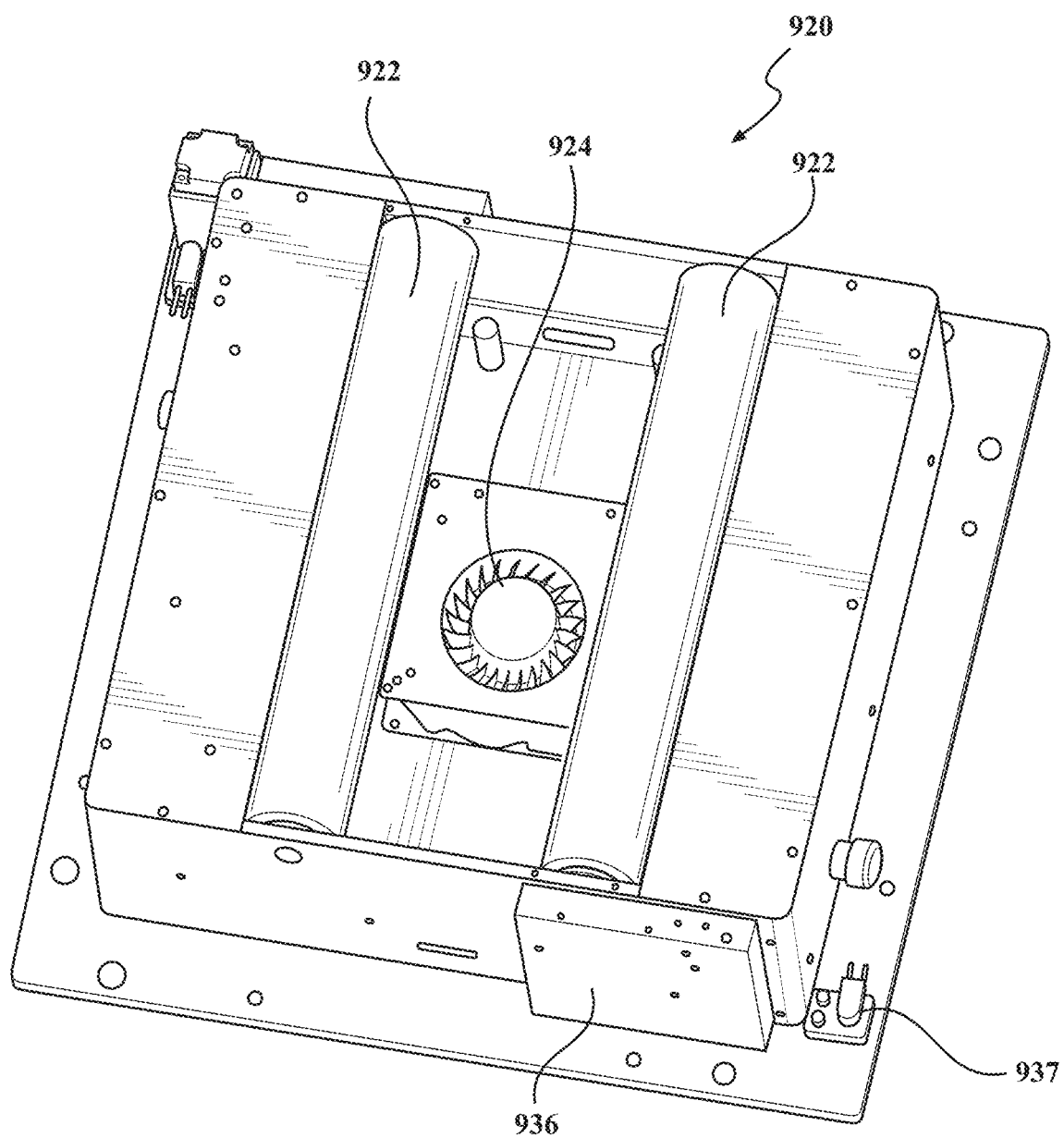
FIG. 9 is a perspective view of a cleaner assembly.
Figure 10:
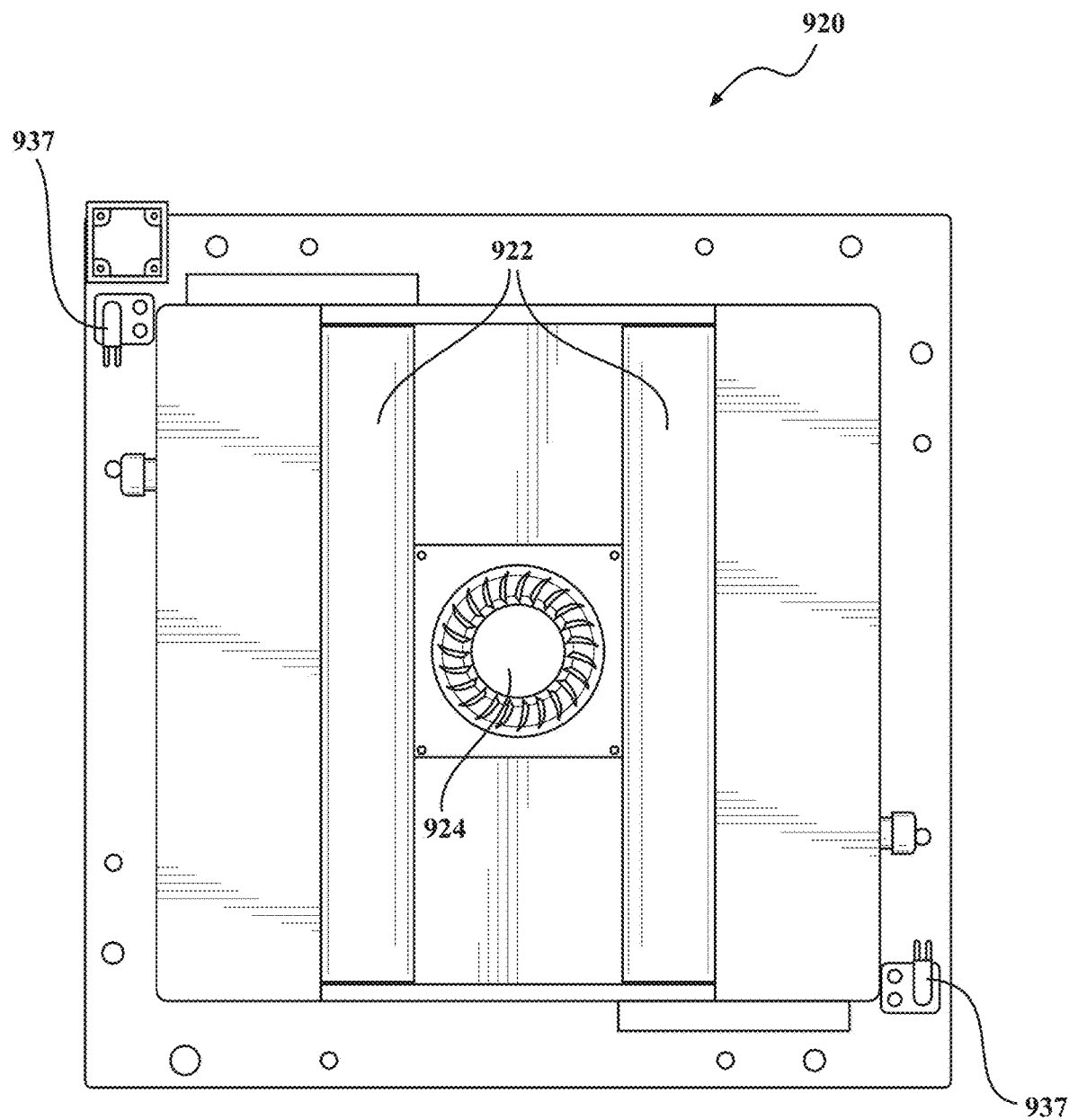
FIG. 10 is a top elevation view of the cleaner assembly of FIG. 9.
Figure 11:
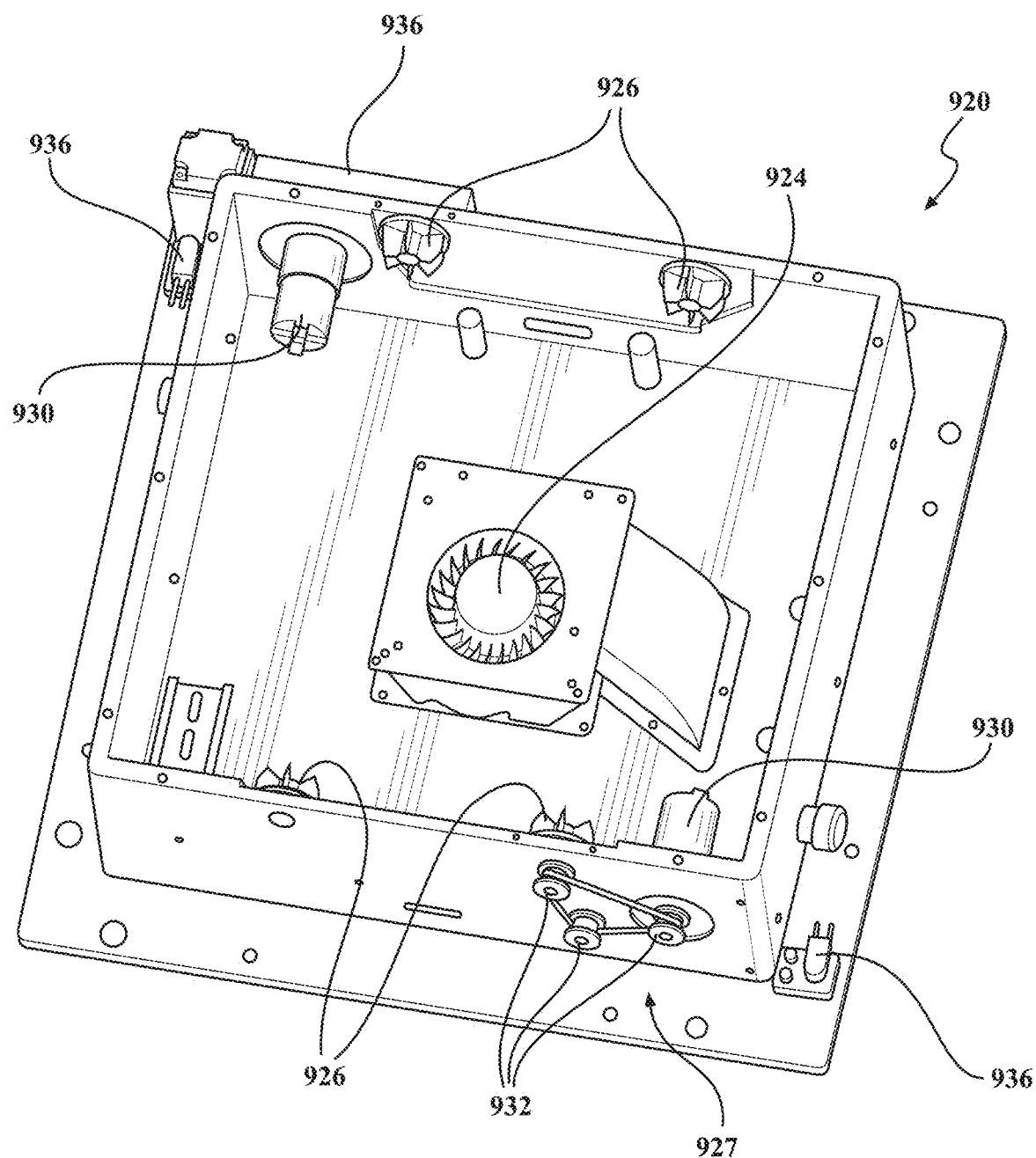
FIG. 11 is a fragmentary and perspective view of the cleaner assembly of FIG. 9.
Figure 12:
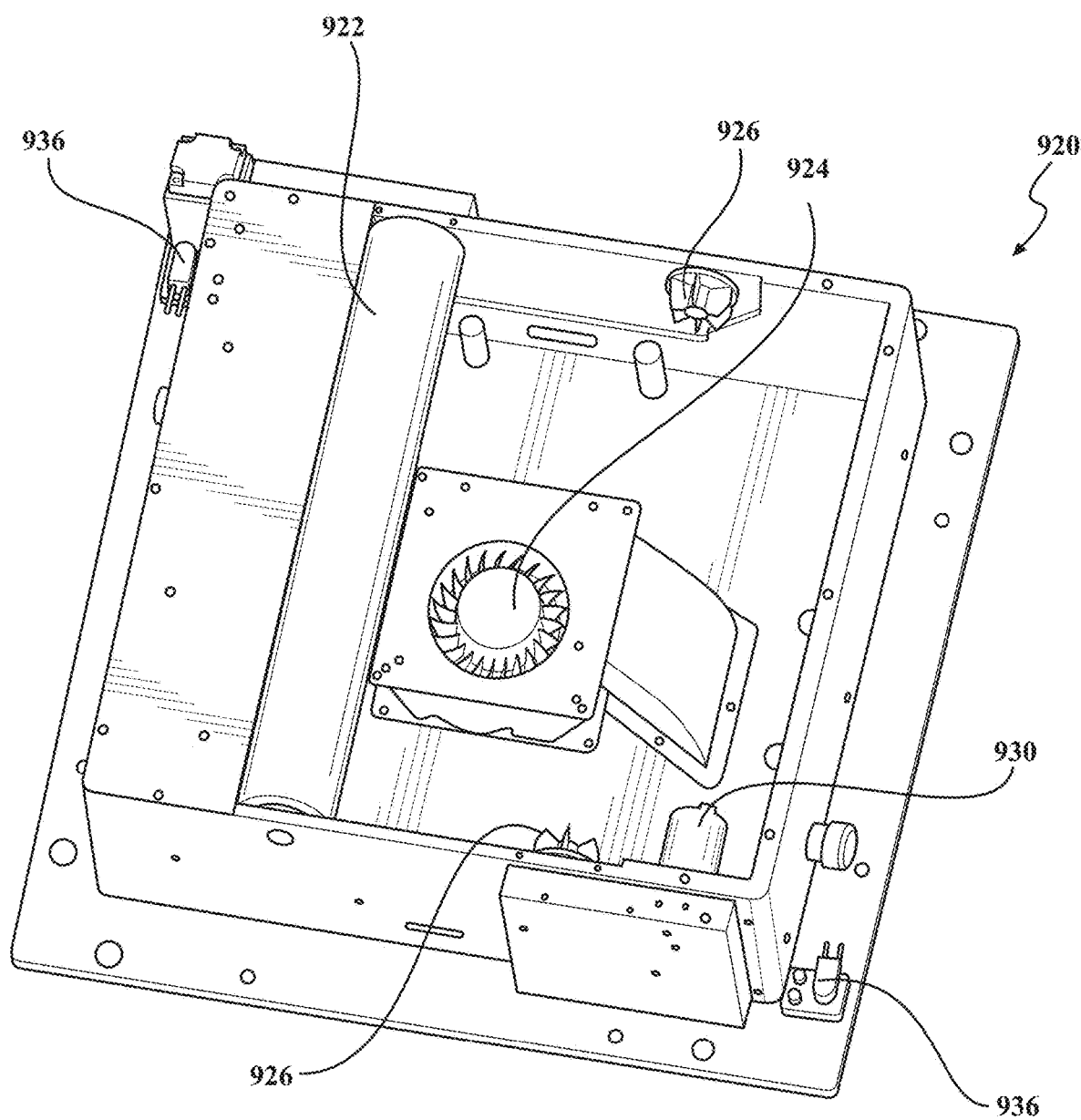
FIG. 12 is another fragmentary and perspective view of the cleaner assembly of FIG. 9.

As shown in FIGS. 6 and 8, a base plate 820 (or sheet) is positioned beneath each automated dispensing device 212 directly beneath the prefill assemblies 404. The base plate 820 includes a plurality of holes 822 which are individually aligned with the chutes 424, 426 in the prefill assemblies 404 such that medications can fall through the chutes 424, 426 and through the respective holes 822. Thus, in operation, the pallet system 406 aligns an opening of one of the containers 304 with a predetermined one of these holes 822, and then the prefill assembly 404 opens the appropriate gate 428 to allow the medications staged in the chute 424, 426 to fall under the influence of gravity through the aligned hole 822 in the base plate 820 and directly into the container 304. The base plate 820 in the exemplary embodiment is made of injection molded plastic. However, any suitable material may be employed. The number of holes 822 formed into the base plate 820 depends on the number of prefill assemblies 404 associated therewith and the number of chutes 424, 426 in each prefill assembly 404. Each automated dispensing device 212 may include only a single base plate 820 or may include multiple base plates 820. In some embodiments, a single base plate 820 may be shared by multiple automated dispensing devices 212. During operation, dust (such as from pills) can accumulate on this base plate 820, and therefore, periodic cleaning is required to remove this dust to prevent medications from sticking to the base plate 820 and failing to fall into the appropriate containers 304.

Figure 20:
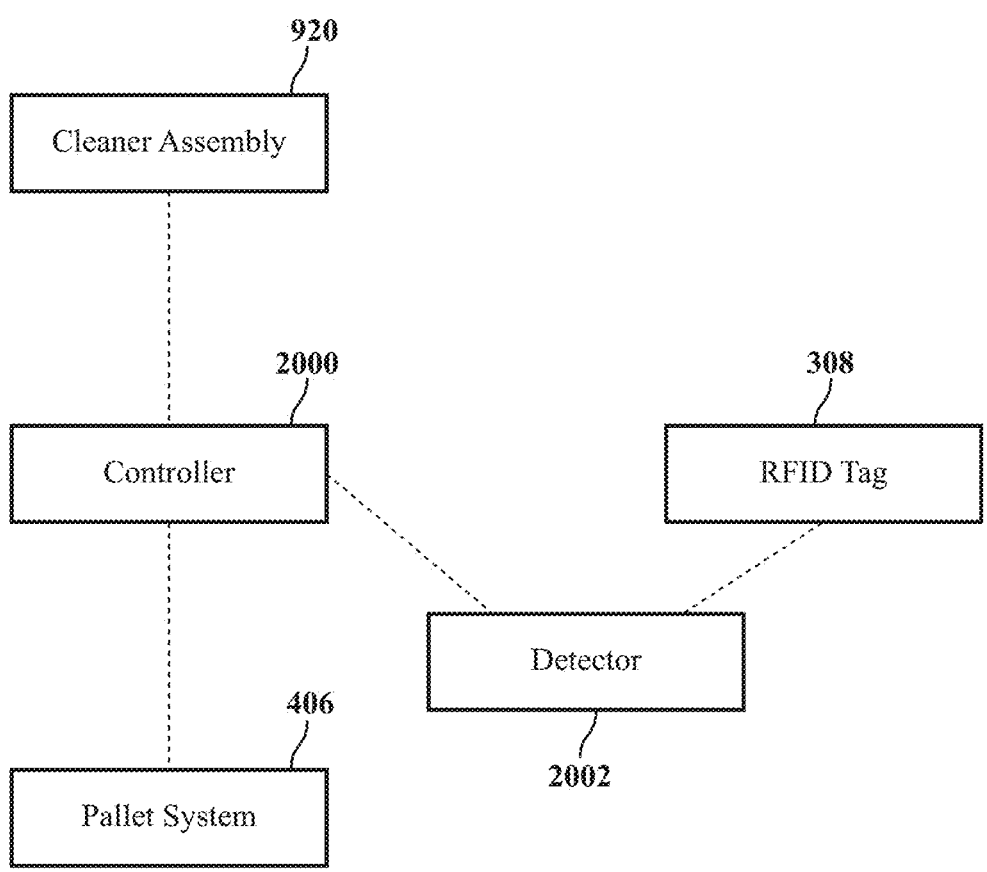
FIG. 20 is a schematic block diagram of a system that includes a controller, a detector, an RFID, the pallet system, and the cleaner assembly.

FIGS. 9-16 show a cleaner assembly 920 for cleaning the base plates 820 of the automated dispensing devices 212. The cleaner assembly 920 is shaped such that it can be mounted on the same type of pallet 302 that carries the containers 304 along the pallet conveyor 408. Thus, the pallet system 406 can automatically bring the cleaner assembly 920 to the base plates 820 in the same manner that the pallet system 820 brings the containers 304 to the base plates 820. The RFID tag 308 disposed on the pallet 302 contains data that communicates to a detector 2002 (schematically illustrated in FIG. 20) and ultimately to the controller 2000 (also schematically illustrated in FIG. 20) of the pallet system 406 that the pallet 302 contains a cleaner assembly 920 so that the controller can direct the pallet system 406 to move the cleaner assembly 920 along a preprogrammed cleaning path whereby the cleaner assembly 920 cleans the base plate 820.

The cleaner assembly 920 includes a base that sits on the pallet 320 and includes four side walls that extend upwardly from the pallet 320 and that are arranged in a generally rectangular pattern, which is substantially square in the exemplary embodiment. A pair of rollers 922 are rotatably supported by opposing ones of the side walls and extend in spaced and parallel relationship with one another. The rollers 922 are substantially identical in construction with each other, each having a generally cylindrical shape and having a textured outer surface for wiping and/or scraping dust and other contaminants off of the base plates 822 of the automated dispensing devices 212. The rollers 922 project upwardly above the side walls such that the uppermost features of the cleaner assembly 920 are the rollers 922. The textured outer surface may be, for example, a nap material or a foam material. In one presently preferred embodiment, the nap on the outer surface of the roller is approximately three-sixteenth of an inch (3/16"). The nap can be in the range of 1'8", +/−1/16", in some embodiments. The nap material can create an electrostatic charge to attract dust and collect dust in the nap, which can feed the dust to the vacuum or blower. The nap can also act to disturb dust and particles using mechanical action, e.g., fibers in the nap directly contacting dust and parts of the fulfillment devices or by creating a wind disturbance or vortex in the air adjacent the fulfillment devices to dislodge the dust from the fulfillment devices or other equipment in the system. In other embodiments, other types of texturing or other materials may be employed.

At least one blower 924 is disposed in a space between the rollers 922 and is configured to suck air, dust, and other particles that are removed from the base plate 820 out of the space between the rollers 922 into a compartment (not shown), which stores these contaminants until the compartment can be emptied while the cleaner assembly 920 is at its home base 730 (discussed in further detail below) and not in use. The blower 924 is recessed downwardly below the side walls to define an open space above the blower 924 and between the rollers 922. The cleaner assembly 920 preferably further includes one or more filters (not shown) for filtering the air being propelled by the blower 924 from this open space to the compartment. The blower 924 and rollers 922 are preferably powered by one or more an electric motors which is/are powered by a battery or batteries.

Each roller 922 is operably supported on opposite ends by a pair of roller holders 926. Each roller holder 926 includes a plurality of flanges that extend radially outwardly and engage with an inner surface of the roller 922. The roller holders 926 are operably attached by the side walls via respective bearings 928 (or bushings) to allow the roller holders 926 and the rollers 922 attached thereto to rotate about respective central axes. For each roller 922, one of the roller holders 926 is attached with a small plate (the small plate being removed in FIG. 13 to expose the space where it fits), which can be detached from the associated side wall. This roller holder 926 can thus be detached from the side wall to allow the roller 924 attached thereto to be changed by detaching the small plate from the side wall. One or both of the bearings 928 or bushings is/are preferably pivotable to allow the roller holder 926 and roller 922 to be articulated relative to the side wall when either removing a roller 924 from the cleaner assembly 920 or installing a new roller 924 into the cleaner assembly 920.

For each roller 924, one of the roller holders 926 is undriven and the other is driven. In the exemplary embodiment, the driven roller holder 926 is operably connected with an electric motor 930 via a belt and pulley system 927 (shown in FIG. 11). The belt and pulley system 930 includes a total of three pulleys 932. One of the pulleys 932 is directly coupled with the electric motor 930, a second pulley 932 is a free pulley, and a third pulley 932 is directly attached with the driven roller holder 926. In the exemplary embodiment, a rod 934 extends from the driven roller holder 926, through the bearing 928 or bushing in the side wall, and to the pulley 932. The rod 934 has a flat surface (shown in FIG. 16) or any suitable locking means that cooperates with a similarly shaped feature in the pulley 932 so that the pulley 932 and the driven roller holder 926 are rotationally fixed with one another. In the exemplary embodiment, the pulley 932 that is attached with the electric motor 932 can be moved within predetermined restraints relative to the other pulleys 932 to add or remove tension to or from the belt (not shown). The belt and pulley system 927 is preferably contained within a sub-housing 936 that can be detachably connected with one of the side walls to protect the belt and pulley system from interference or damage. A motor mount may be provided to support the electric motor 932.

Figure 7:
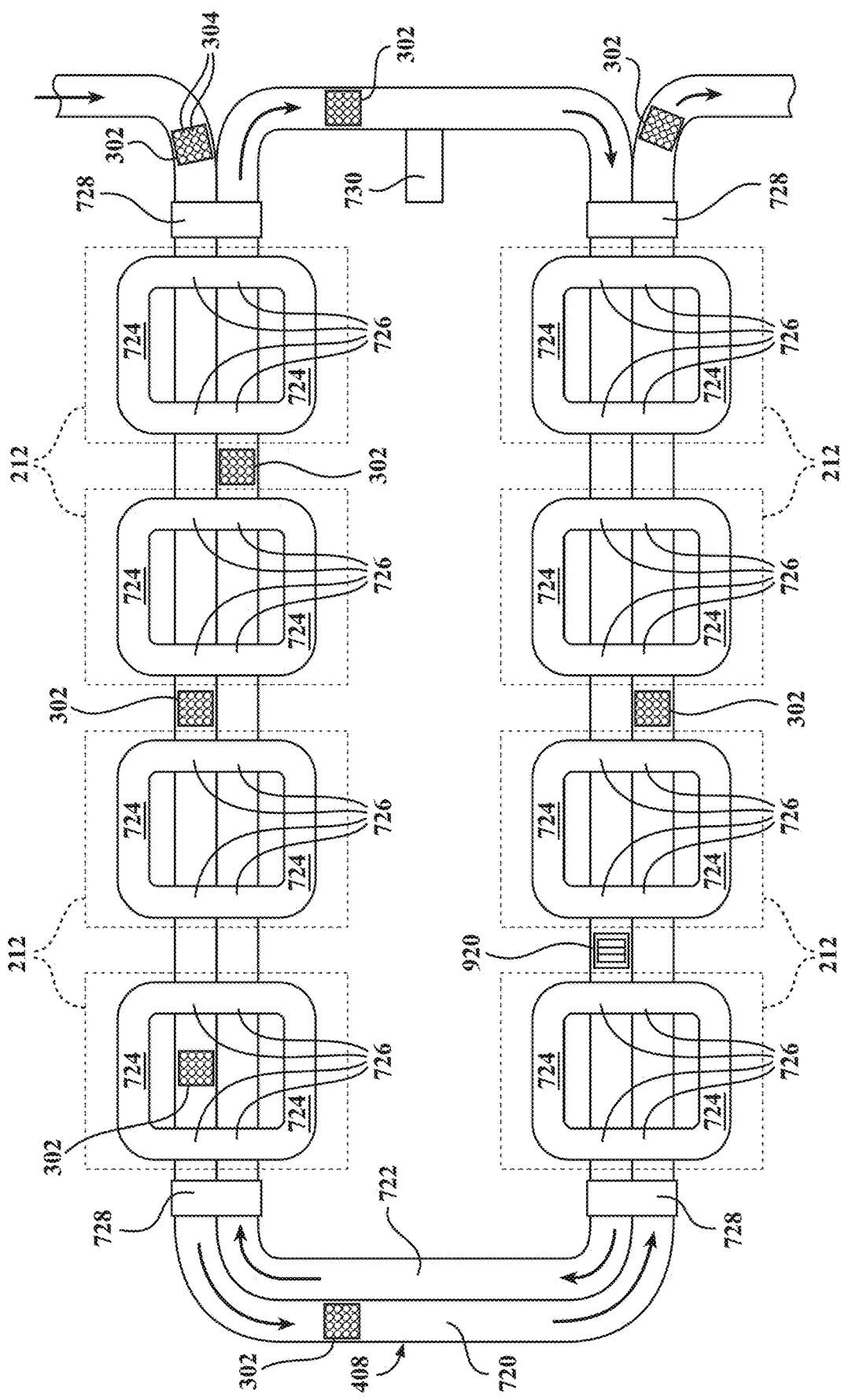
FIG. 7 is a schematic diagram showing a filling area including a plurality of the automated dispensing devices.

Referring now to FIG. 7, the pallet conveyor 408 includes a pair of main lines, namely an outer main line 720 and an inner main line 722, or tracks that extend through a plurality of the automated dispensing devices 212 in a filling area of the pharmacy fulfillment device 112 (shown in FIG. 2). Within the filling area, one end of the outer main line 720 (main track) receives the pallets 302 with empty containers 304 from another area of the pharmacy fulfillment device 112, and the other end of the outer main line 720 delivers the pallets 302 with filled containers 304 out of the filling area and to another area of the pharmacy fulfillment device 112. Within the filling area, the outer main line 720 extends along a non-closed loop path that is generally U-shaped, and the inner main line 722 extends through a closed-loop, oval-shaped path. The inner main line 722 is positioned directly adjacent the outer main line 720 along the majority of the length of the inner main line 720. In operation, the outer main line 720 conveys the pallets 302 in one direction (for example, a counter-clockwise direction), and the inner main line 722 conveys the pallets 302 in an opposite direction (for example, a clockwise direction). In some embodiments, the pallet conveyor 408 could include only one main line or it could include three or more main lines, and those main lines could have very different shapes than the one shown in the exemplary embodiment of FIG. 7.

A plurality of the automated dispensing devices 212 are arranged along each of the main lines 720, 722. For each of the automated dispensing device 212, a sub-track 724 runs from the adjacent ones of the main lines 720, 722 towards the respective automated dispensing device 212 for queuing one or more pallets 302 while the pallet system 406 is in use. In operation, the pallet system 406 lifts a pallet 302 off of the sub-track 724 and carries it to the automated dispensing device 212 for filling one or more containers 304 and then returns the pallet 302 back to the sub-track 724 when the filling operation is completed. The pallet conveyor 408 further includes a plurality of first transfer mechanisms 726 that are configured to selectively guide a pallet 302, including any containers 304 disposed thereon, from one of the main lines 720, 722 onto a sub-track 724 or vice versa. The pallet conveyor 408 also includes a plurality of second transfer mechanisms 728 that are configured to transfer pallets 302 between the main lines 720, 722 (i.e., from one main line to the other). Through this system of transfer mechanisms 726, 728, any pallet 302 can be automatically maneuvered to any of the automated dispensing devices 212, such that any container 304 can be filled with any of the medications contained in the automated dispensing devices 212 in the manner described in more detail below and such that the cleaner assembly 920 can clean any of the automated dispensing devices 212.

To fill a container 304 on a pallet 302 waiting on one of the sub-tracks 724, the pallet conveyor 408 engages the pallet 302 and maneuvers it to a location directly vertically beneath the automated dispensing device 212. The prefill assembly is then actuated to dispense the measured quantity of pharmaceuticals being held by the prefill assembly into appropriate container 304. This process can be repeated to dispense multiple measured quantities of the same or different pharmaceuticals into different containers 304 on the pallet 302. The pallet conveyor 408 may be a chain conveyor or a belt driven conveyor, e.g., a belted Bosch TS2 belt-driven conveyor. In some embodiments, the pallet conveyor 408 is a low friction, high speed conveyor. Although pallets 302 are generally described herein as employed to move a group of containers 304 through the system 100 or within the automated dispensing device 212, trays or other types of carriers and any suitable type of container management system may be employed to individually or as a group move the containers 304 through the system 100 or within the automated dispensing device 212.

When not in use, the cleaner assembly 920 is stored in a home base 730 (shown in FIG. 7) that is adjacent one of the main lines 720, 722. The cleaner assembly 920 can then be automatically transferred from the home base 730 onto one of the main lines 720, 722 when the base plate 820 of one of the automated dispensing devices 212 requires cleaning. The home base 730 may be easily accessed by a user without interfering with the operation of the pallet conveyor 408 such that the cleaning assembly 920 can be emptied of dust and other contaminants without interfering with the operation of the pallet system 406 or any of the automated dispensing devices 212. The home base 730 also may include a charging port for automatically charging one or more batteries in the cleaner assembly 920. The charging port could be either wired or wireless. In one exemplary embodiment, the cleaner assembly 920 includes a plurality of Lithium-Ion batteries. In other embodiments, different types of rechargeable batteries are employed, e.g. nickel-cadmium or nickel metal hydride.

In an example, the memory on the cleaner assembly 920 can be loaded with cleaning instruction tasks at the home base. The cleaning instruction tasks can be stored in a remote server that is part of the fulfillment center. These instructions can provide the controller circuitry, e.g., a dedicated processor, on board the cleaner assembly with the tasks it should perform to clean the fulfillment system, e.g., along the conveyor path. The instructions set the tasks of when the rollers should be operated and when the blower is operated. The instructions can also set the suction power of the blower and the revolution speed of the rollers. The same type of dispensing equipment may have different cleaning instructions based on the types of pills being dispensed and the quantity of pills being dispensed from each device.

Figure 17:
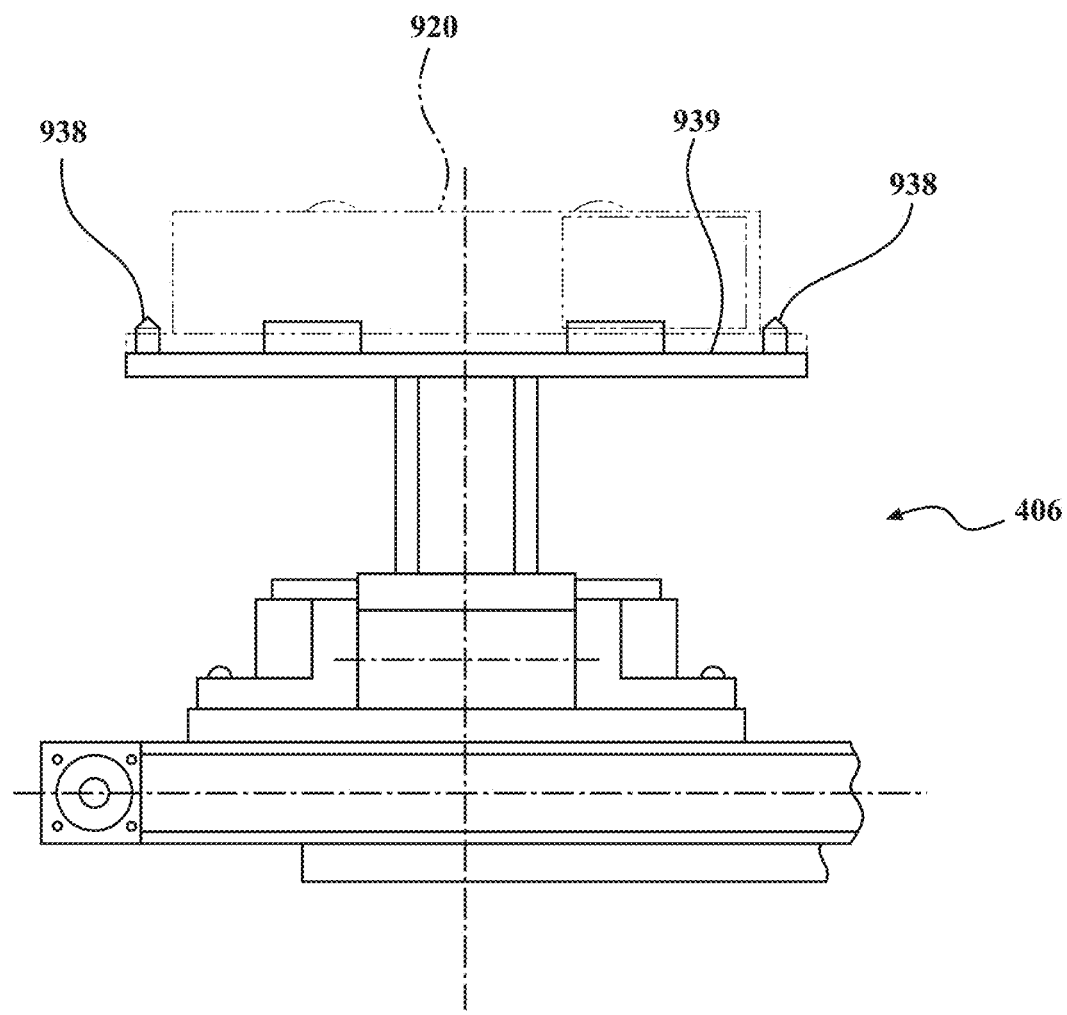
FIG. 17 is a front view showing a pallet system that can be used in the filling area of FIG. 7.
Figure 18:
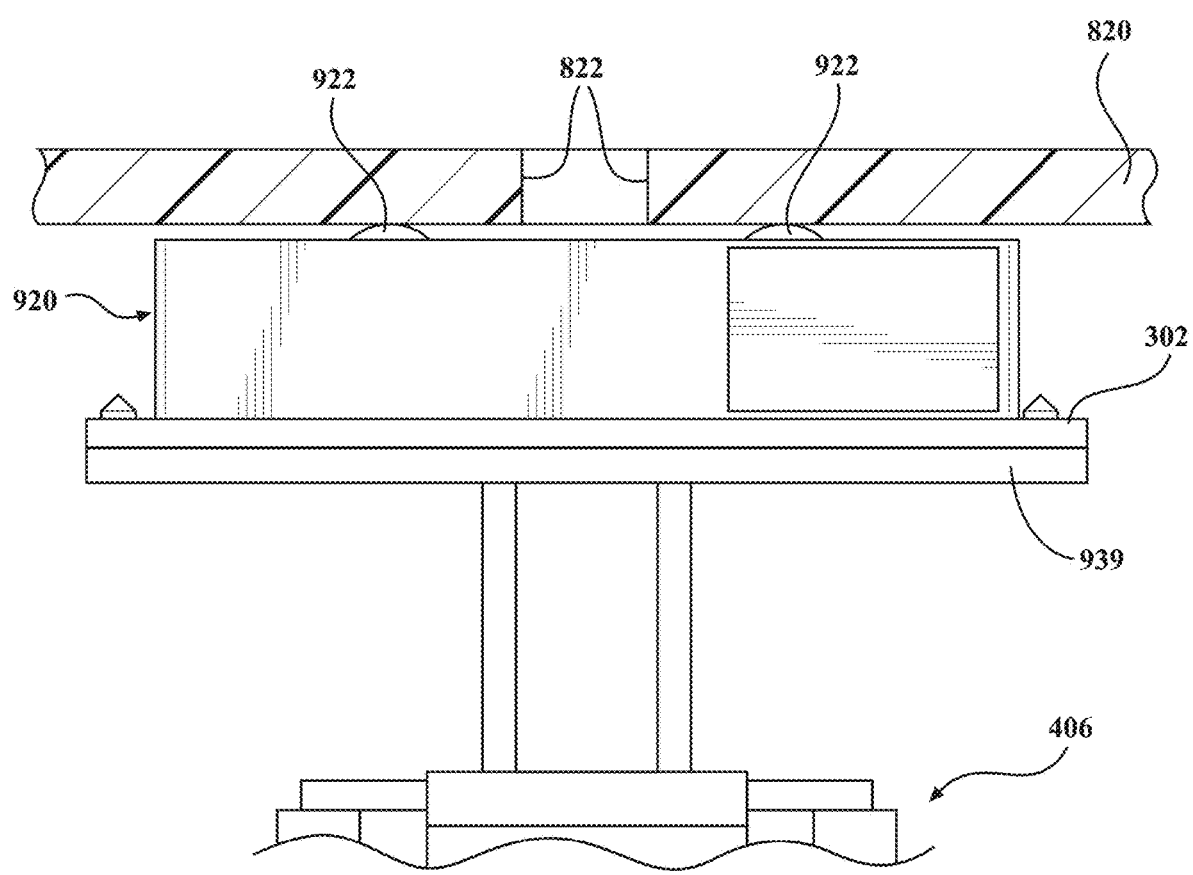
FIG. 18 is a front view showing the cleaner assembly of FIG. 9 being held on the pallet system of FIG. 17 and cleaning a base plate of an automated dispensing device.

In operation, prior to the cleaner assembly 920 being brought by the pallet conveyor 408 to engage the rollers 922 with the base plate 820 of the automated dispensing device 212, the rollers 922 and blower 924 are activated with the rollers 922 being driven in opposite rotational directions such that dust and debris removed from the base plate 820 is guided into the open space between the rollers 922 and towards the blower 924. In the exemplary embodiment, the cleaner assembly 920 further includes a pair of switches 937 positioned on opposite sides of the base plate 820 from one another and which are in electrical connection with the electric motors 930 for the rollers 922 and with the electric motor for the blower 924. When the cleaner assembly 920 is transferred from one of the sub-tracks 724 onto the pallet system 406, a pair of locating pins 938 (shown in FIG. 17) on a tray 939 of the pallet conveyor 408 extend through respective openings in the pallet 302 to engage with and activate the switches 936, thereby activating the rollers 922 and the blower 924. These components remain activated as the pallet conveyor 408 moves the cleaner assembly 920 along a predetermined path (for example, a zig-zag path) to fully clean the base plate 820 of the automated dispensing device 212. When the cleaner assembly 920 is transferred back from the tray 939 to the sub-track 724, disengagement of the locating pins 938 from the switches 936 automatically turns off the rollers 922 and blower 924, thereby preserving battery life. In other embodiments, the rollers 922 and blower 924 may be activated and deactivated through other suitable means, e.g., proximity sensors. FIG. 18 shows the tray 939 lifting the cleaner assembly 920, which is cleaning a base plate 820.

According to yet another embodiment, the cleaner assembly may be activated via one or more proximity sensors. The proximity sensors may be placed adjacent the automated dispensing devices such that the cleaner assembly automatically turns on when in the locality of one of the automated dispensing devices and automatically turns off when distant from the automated dispensing device. In another embodiment, the proximity sensors can be configured to automatically activate or deactivate only one or more features of the cleaner assembly, e.g., only the blower or only the rollers.

Figure 19:
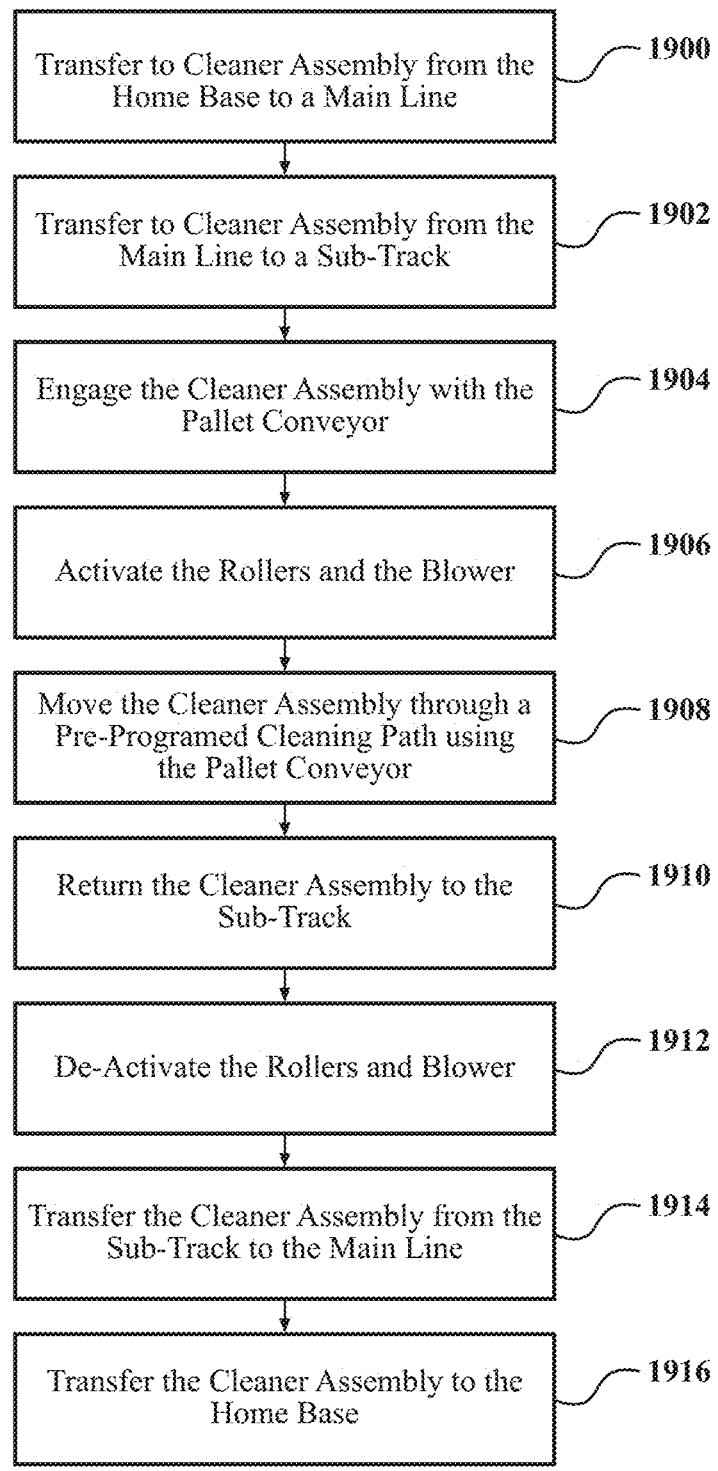
FIG. 19 is a flow chart illustrating the steps of a method of cleaning a base plate of an automated dispensing device.

FIG. 19 depicts a flow chart illustrating the steps of an exemplary method of operating the cleaner assembly 920 described above. At step 1900, a controller of the pallet conveyor 408 receives a signal that one or more of the base plates 820 requires cleaning, and the cleaner assembly is transferred from the home base 730 to one of the main lines 720, 722. The signal could be either in response to one of the automated dispensing devices 212 sensing that cleaning is required or the controller could be configured to clean each base plate 820 at periodic intervals, e.g., once a week.

The cleaner assembly 920 is then guided through the pallet conveyor 408 to the sub-tracks 724 associated with the automated dispensing device 212 that contains the base plate 820 which needs to be cleaned. The guidance process may involve transferring the cleaner assembly 920 from one of the main lines 720, 722 to the other using one of the second transfer mechanisms 728 in the same manner that the pallets 302 holding the containers 304 are transferred between the main lines 720, 722.

At step 1902, the cleaner assembly 920 is transferred from the main line 720, 722 to the sub-track 724. The cleaner assembly 920 may then be held on the sub-track 724 in a queue while the pallet system 406 handles one of the other pallets 302 to fill one or more containers 304 with medications. Once the pallet assembly 406 is free, at step 1904, it lifts the pallet 302 containing the cleaner assembly 920. At step 1906, the rollers 922 and the blower 924 are activated. Step 1906 may be performed simultaneous with step 1904 by engaging a locating pin on the pallet assembly 406 with a switch 936 on the cleaner assembly 920.

At step 1908, the pallet system 406 moves the cleaner assembly 920 through a pre-programmed pattern which engages the rollers 922 with the base plate 820 and moves the rollers 922 along the base plate 820 to clean the base plate 820. After step 1908 is completed, at step 1910, the pallet system 406 returns the cleaner assembly 920 back to the sub-track 724. At step 1912, the rollers 922 and the blower 924 are deactivated. Steps 1910 and 1912 may be performed simultaneously by disengaging the locating pins 938 from the switches 936.

At step 1914, the cleaner assembly 920 is transferred from the sub-track 724 back to one of the main lines 720, 722 using one of the first transfer mechanisms 726. At step 1916, the cleaner assembly 920 is transferred back to the home base 820. The cleaner assembly 920 may clean one or more additional base plates 730 prior to returning to the home base 730.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Further, all or a portion of implementations of the present disclosure may take the form of a computer program product accessible from, for example, a computer-usable or computer-readable medium. The program includes steps to perform, at least, portions of the methods described herein. A computer-usable or computer-readable medium may be any device that can, for example, tangibly contain, store, communicate, or transport the program for use by or in connection with any processor. The medium may be, for example, an electronic, magnetic, optical, electromagnetic, or a semiconductor device. Other suitable mediums are also available.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other.

What is claimed is:

1. An automated pharmaceutical dispensing system for dispensing medications into medication containers, comprising:
 a plurality of pallets, said plurality of pallets including a plurality of first pallets with medication containers, and said plurality of pallets including at least one second pallet with cleaner assembly;
 a conveyor assembly configured to bring said pallets to at least one automated dispensing device;
 said conveyor assembly being further configured to move said first pallets that contain medication containers to predetermined positions adjacent said at least one automated dispensing device, wherein the at least one automated dispensing device is configured to dispense pharmaceuticals can into said medication containers, and said conveyor assembly being further configured to move said second pallet that includes a cleaner assembly through a predetermined cleaning path whereby said cleaner assembly cleans a base plate of said at least one automated dispensing device;

a detector adjacent the at least one automated dispensing device and configured to detect data on a pallet; and a controller in electrical communication with the detector and being configured to determine if the pallet is a first pallet that carries medication containers or is a second pallet that contains the cleaner assembly based on the data.

2. The automated pharmaceutical dispensing system as set forth in claim 1 wherein said at least one automated dispensing device contains a plurality of pharmaceuticals and a plurality of chutes; and said conveyor assembly is configured to move any of said medication containers on one of said pallets into alignment with any of said plurality of chutes.

3. The automated pharmaceutical dispensing system as set forth in claim 2 wherein said at least one automated dispensing device includes a plurality of automated dispensing devices.

4. The automated pharmaceutical dispensing system as set forth in claim 3 wherein said conveyor and a pallet system move said cleaner assembly to the plurality of automated dispensing devices.

5. The automated pharmaceutical dispensing system as set forth in claim 3 wherein said conveyor assembly includes at least one main track and a plurality of sub-tracks that extend from said main tracks to locations vertically below said automated dispensing devices so that the pharmaceuticals can fall under the influence of gravity from said automated dispensing devices into said medication containers on said pallet.

6. The automated pharmaceutical dispensing system as set forth in claim 5 further including a home base that is operably connected with at least one main track for holding said cleaner assembly between cleanings so that a user can safely empty said cleaner assembly of contaminants while said at least one automated dispensing devices are in operation.

7. The automated pharmaceutical dispensing system as set forth in claim 3 wherein said at least one main track includes a pair of main tracks with one of said main track extending through an open loop for receiving pallets into said automated dispensing system and for delivering pallets out of said automated dispensing system and with the other of said main tracks extending through a closed loop.

8. The automated pharmaceutical dispensing system as set forth in claim 1 wherein said cleaner assembly includes:
a pallet;
a plurality of side walls enclosing an inner chamber;
a blower configured to propel contaminants into said inner chamber; and
at least one roller operably supported by and projecting above at least one of said side walls, said at least one roller being configured to scrape contaminants off of a base plate of the at least one automated dispensing device and towards said blower.

9. The automated pharmaceutical dispensing system as set forth in claim 8 wherein said at least one roller includes a pair of rollers, wherein said blower is located between said rollers, and wherein said rollers are configured to be driven in opposite rotational directions to direct the contaminants towards the blower.

10. The automated pharmaceutical dispensing system as set forth in claim 8 wherein the cleaner assembly further includes at least one switch mounted to be automatically activated when said cleaner assembly is in a cleaning position adjacent the at least one automated dispensing device and mounted to be automatically deactivated when said cleaner assembly is brought away from the at least one automated dispensing device.

11. An automated pharmaceutical dispensing system for dispensing medications into medication containers, comprising:
a plurality of pallets, the plurality of pallets including a plurality of first pallets with medication containers, and the plurality of pallets including at least one second pallet with a cleaner assembly, wherein the cleaner assembly includes a plurality of side walls enclosing an inner chamber; a blower configured to propel contaminants into the inner chamber; and at least one roller operably supported by and projecting above at least one of the side walls, the at least one roller being configured to scrape contaminants off of a base plate of the at least one automated dispensing device and towards the blower;
a conveyor assembly configured to bring the pallets to at least one automated dispensing device;
the conveyor assembly being further configured to move the first pallets that contain medication containers to predetermined positions adjacent the at least one automated dispensing device, wherein the at least one automated dispensing device is configured to dispense pharmaceuticals can into the medication containers, and the conveyor assembly being further configured to move the second pallet that includes a cleaner assembly through a predetermined cleaning path whereby the cleaner assembly cleans a base plate of the at least one automated dispensing device;
a detector adjacent the at least one automated dispensing device and configured to identify a pallet; and
a controller in electrical communication with the detector and being configured to determine if the pallet is a first pallet that carries medication containers or is a second pallet that contains the cleaner assembly based on the data.

12. The automated pharmaceutical dispensing system as set forth in claim 11, wherein the at least one roller includes a pair of rollers, wherein the blower is located between the rollers, and wherein the rollers are configured to be driven in opposite rotational directions to direct the contaminants towards the blower.

13. The automated pharmaceutical dispensing system as set forth in claim 11, wherein the cleaner assembly further includes at least one switch mounted to be automatically activated when the cleaner assembly is in a cleaning position adjacent the at least one automated dispensing device and mounted to be automatically deactivated when the cleaner assembly is brought away from the at least one automated dispensing device.

14. The automated pharmaceutical dispensing system as set forth in claim 11, wherein the conveyor assembly is simultaneously moves at least one of the first pallets and the at least one second pallet.

15. The automated pharmaceutical dispensing system as set forth in claim 11, wherein the at least one automated dispensing device includes a plurality of automated dispensing devices.

16. The automated pharmaceutical dispensing system as set forth in claim 15, wherein the conveyor and a pallet system move the cleaner assembly to the plurality of automated dispensing devices.

17. The automated pharmaceutical dispensing system as set forth in claim 16 wherein the conveyor assembly includes at least one main track and a plurality of sub-tracks that extend from the at least one main track to locations vertically below the automated dispensing devices so that the pharmaceuticals can fall under the influence of gravity from the automated dispensing devices into the medication containers on the first pallets.

18. An automated pharmaceutical dispensing system for dispensing medications into medication containers, comprising:
 a plurality of pallets, the plurality of pallets including a plurality of first pallets with medication containers, and the plurality of pallets including at least one second pallet with a cleaner assembly, wherein the cleaner assembly includes a plurality of side walls enclosing an inner chamber; a blower configured to propel contaminants into the inner chamber; and at least one roller operably supported by and projecting above at least one of the side walls, the at least one roller being configured to scrape contaminants off of a base plate of the at least one automated dispensing device and towards the blower;
 a conveyor assembly configured to bring the pallets to at least one automated dispensing device;
 the conveyor assembly being further configured to move the first pallets that contain medication containers to predetermined positions adjacent the at least one automated dispensing device, wherein the at least one automated dispensing device is configured to dispense pharmaceuticals into the medication containers, and the conveyor assembly being further configured to move the second pallet that includes the cleaner assembly through a predetermined cleaning path whereby the cleaner assembly cleans a base plate of the at least one automated dispensing device;
 wherein the conveyor assembly includes at least one main track and a plurality of sub-tracks that extend from the at least one main track to locations vertically below the automated dispensing devices so that the pharmaceuticals can fall under the influence of gravity from the automated dispensing devices into the medication containers on the plurality of first pallets;
 wherein the conveyor assembly simultaneously moves at least one of the first pallets and the at least one second pallet;
 a detector adjacent the at least one automated dispensing device and configured to identify a pallet; and
 a controller in electrical communication with the detector and being configured to determine if the pallet is a first pallet that carries medication containers or is a second pallet that contains the cleaner assembly based on the data.

19. The automated pharmaceutical dispensing system as set forth in claim 18, wherein the at least one roller includes a pair of rollers, wherein the blower is located between the rollers, and wherein the rollers are configured to be driven in opposite rotational directions to direct the contaminants towards the blower.

20. The automated pharmaceutical dispensing system as set forth in claim 19, wherein the cleaner assembly further includes at least one switch mounted to be automatically activated when the cleaner assembly is in a cleaning position adjacent the at least one automated dispensing device and mounted to be automatically deactivated when the cleaner assembly is brought away from the at least one automated dispensing device.

* * * * *